(12) United States Patent
Zhang et al.

(10) Patent No.: US 11,113,697 B2
(45) Date of Patent: Sep. 7, 2021

(54) METHOD AND APPARATUS FOR OFFLINE PAYMENT, SERVICE PROCESSING, AND PAYMENT PROCESSING

(71) Applicant: Advanced New Technologies Co., Ltd., Grand Cayman (KY)

(72) Inventors: Huacheng Zhang, Hangzhou (CN); Wei Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/129,520

(22) Filed: Dec. 21, 2020

(65) Prior Publication Data

US 2021/0110395 A1    Apr. 15, 2021

Related U.S. Application Data

(63) Continuation of application No. 16/906,862, filed on Jun. 19, 2020, now Pat. No. 10,872,342, which is a
(Continued)

(51) Int. Cl.
*G06Q 20/40* (2012.01)
*G06Q 40/00* (2012.01)
(Continued)

(52) U.S. Cl.
CPC ........... *G06Q 20/405* (2013.01); *G06Q 20/24* (2013.01); *G06Q 20/3278* (2013.01);
(Continued)

(58) Field of Classification Search
CPC .......................... G06Q 20/405; G06Q 20/322
See application file for complete search history.

(56) References Cited

U.S. PATENT DOCUMENTS 10,692,091 B2  6/2020  Zhang et al.
10,872,342 B2  12/2020  Zhang et al.
(Continued)

FOREIGN PATENT DOCUMENTS

CN    101211435    7/2008
CN    102592220    7/2012
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — A. Hunter Wilder
(74) *Attorney, Agent, or Firm* — Fish & Richardson P.C.

(57) ABSTRACT

One or more implementations shown in the present specification provide an offline payment method. A communication connection between a collection device and a payment device is established, wherein both the collection device and the payment device are in an offline state. Payment data sent by the collection device is received by the payment device through the communication connection established to the collection device. Payment processing based on the payment data and account information of the payment device is performed by the payment device, to obtain a payment result. The payment result is returned, by the payment device to the collection device through the communication connection. Collection processing is performed, by the collection device, based on the payment result and obtained account information of the payment device, to obtain a collection result.

20 Claims, 24 Drawing Sheets

Related U.S. Application Data continuation of application No. 16/685,358, filed on Nov. 15, 2019, now Pat. No. 10,692,091, which is a continuation of application No. PCT/CN2018/100777, filed on Aug. 16, 2018.

(51) Int. Cl.
*H04W 4/80* (2018.01)
*G06Q 20/24* (2012.01)
*G06Q 20/32* (2012.01)
*G06Q 20/20* (2012.01)

(52) U.S. Cl.
CPC .............. *G06Q 40/12* (2013.12); *H04W 4/80* (2018.02); *G06Q 20/202* (2013.01); *G06Q 20/322* (2013.01); *G06Q 20/327* (2013.01)

(56) References Cited

U.S. PATENT DOCUMENTS

| | | | |
|---|---|---|---|
| 2003/0236748 | A1 | 12/2003 | Gressel et al. |
| 2010/0088231 | A1* | 4/2010 | Eugenio ............ H04M 1/72403 705/44 |
| 2014/0229304 | A1 | 8/2014 | White |
| 2016/0180317 | A1 | 6/2016 | Cozens et al. |
| 2016/0302025 | A1 | 10/2016 | Bell et al. |
| 2017/0024724 | A1 | 1/2017 | Kwak |
| 2017/0032370 | A1 | 2/2017 | Beltramino et al. |
| 2018/0330346 | A1* | 11/2018 | Grassadonia .......... G06Q 20/10 |
| 2019/0347626 | A1 | 11/2019 | Wullschleger et al. |
| 2020/0082404 | A1 | 3/2020 | Zhang et al. |
| 2020/0320533 | A1 | 10/2020 | Zhang et al. |

FOREIGN PATENT DOCUMENTS

| | | | |
|---|---|---|---|
| CN | 103077456 | | 5/2013 |
| CN | 103617532 | | 3/2014 |
| CN | 103617532 | A * | 3/2014 |
| CN | 104252675 | | 12/2014 |
| CN | 104915828 | | 9/2015 |
| CN | 105631661 | | 6/2016 |
| CN | 105956855 | | 9/2016 |
| CN | 106096951 | | 11/2016 |
| CN | 106327186 | | 1/2017 |
| CN | 106339868 | | 1/2017 |
| CN | 106980965 | | 7/2017 |
| CN | 106997527 | | 8/2017 |
| CN | 107665427 | | 2/2018 |
| JP | 2002049870 | | 2/2002 |
| JP | 2013186666 | | 9/2013 |
| JP | 2017513122 | | 5/2017 |
| KR | 20110012072 | | 2/2011 |
| KR | 20130100872 | | 9/2013 |
| KR | 20160135799 | | 11/2016 |
| TW | 201705057 | | 2/2017 |
| WO | WO 2014103543 | | 7/2014 |
| WO | WO 2015148850 | | 10/2015 |
| WO | WO 2016061093 | | 4/2016 |

OTHER PUBLICATIONS

Extended European Search Report in European Application No. 18849076.7, dated Apr. 17, 2020, 8 pages.
Nakamoto. "Bitcoin: A Peer-to-Peer Electronic Cash System," www.bitcoin.org, 2005, 9 pages.
PCT International Preliminary Report on Patentability in International Application No. PCT/CN2018/100777, dated Feb. 25. 2020. 10 pages (with English translation).
PCT International Search Report and Written Opinion in International Application No. PCT/CN2018/100777, dated Nov. 21. 2018, 9 pages (with partial English translation).

* cited by examiner

METHOD AND APPARATUS FOR OFFLINE PAYMENT, SERVICE PROCESSING, AND PAYMENT PROCESSING

CROSS-REFERENCE TO RELATED APPLICATIONS

This application is a continuation of and claims the benefit of priority of U.S. patent application Ser. No. 16/906,862, filed Jun. 19, 2020, which is a continuation of U.S. patent application Ser. No. 16/685,358, filed Nov. 15, 2019, now U.S. Pat. No. 10,692,091, which is a continuation of PCT Application No. PCT/CN2018/100777, filed on Aug. 16, 2018, which claims priority to Chinese Patent Application No. 201710721677.8, filed on Aug. 22, 2017, and each application is hereby incorporated by reference in its entirety.

TECHNICAL FIELD

The present specification relates to the field of computer technologies, and particularly, to a method and an apparatus for offline payment, service processing, and payment processing.

BACKGROUND

With continuous development of computer technologies, various forms of services are constantly being available to people. These services can enable users to perform service processing anytime and anywhere, providing convenience for the users.

Currently, users usually need to process a service in an online state. For example, when a user processes a service by using an end-user device, the end-user device needs to be in an online state, and the end-user device can exchange service data with a server, to complete service processing.

Based on the existing technology, a more effective service processing method is needed.

SUMMARY

The present specification provides an offline payment method, to alleviate a problem, in the existing technology, that payment processing cannot be performed in an offline state.

The present specification provides an offline payment method, including: establishing a communication connection between a collection device and a payment device when both the collection device and the payment device are in an offline state; receiving, by the payment device through the communication connection established to the collection device, payment data sent by the collection device; performing, by the payment device, payment processing based on the payment data and account information of the payment device, to obtain a payment result; returning, by the payment device, the payment result to the collection device through the communication connection; and performing, by the collection device, collection processing based on the payment result and obtained account information of the payment device, to obtain a collection result.

The present specification provides an offline payment method, to alleviate a problem, in the existing technology, that payment processing cannot be performed in an offline state.

The present specification provides an offline payment method, including: establishing a communication connection between a collection device and a payment device when both the collection device and the payment device are in an offline state; sending payment data to the payment device through the communication connection; receiving a returned payment result obtained by the payment device based on the payment data and account information of the payment device; and performing collection processing based on the payment result and obtained account information of the payment device, to obtain a collection result.

The present specification provides an offline payment apparatus, to alleviate a problem, in the existing technology, that payment processing cannot be performed in an offline state.

The present specification provides an offline payment apparatus, including: a connection establishment module, configured to establish a communication connection between the apparatus and a payment device when both the apparatus and the payment device are in an offline state; a sending module, configured to send payment data to the payment device through the communication connection; a receiving module, configured to receive a returned payment result obtained by the payment device based on the payment data and account information of the payment device; and a processing module, configured to perform collection processing based on the payment result and obtained account information of the payment device, to obtain a collection result.

The present specification provides a collection device for offline payment, to alleviate a problem, in the existing technology, that payment processing cannot be performed in an offline state.

The present specification provides a collection device for offline payment, including one or more memories and processors, where the memory stores a program, and the program is executed by the one or more processors to perform the following steps: establishing a communication connection between the collection device and a payment device when both the collection device and the payment device are in an offline state; sending payment data to the payment device through the communication connection; receiving a returned payment result obtained by the payment device based on the payment data and account information of the payment device; and performing collection processing based on the payment result and obtained account information of the payment device, to obtain a collection result.

The present specification provides an offline payment method, to alleviate a problem, in the existing technology, that payment processing cannot be performed in an offline state.

The present specification provides an offline payment method, including: when both a collection device and a payment device are in an offline state, receiving, by the payment device through a communication connection established to the collection device, payment data sent by the collection device; performing payment processing based on the payment data and account information of the payment device, to obtain a payment result; and returning the payment result to the collection device, so that the collection device performs collection processing based on the payment result and obtained account information of the payment device, to obtain a collection result.

The present specification provides an offline payment apparatus, to alleviate a problem, in the existing technology, that payment processing cannot be performed in an offline state.

The present specification provides an offline payment apparatus, including: a receiving module, configured to:

when both a collection device and the apparatus are in an offline state, receive, through a communication connection established to the collection device, payment data sent by the collection device; a processing module, configured to perform payment processing based on the payment data and account information of the apparatus, to obtain a payment result; and a return module, configured to return the payment result to the collection device, so that the collection device performs collection processing based on the payment result and obtained account information of the apparatus, to obtain a collection result.

The present specification provides a payment device for offline payment, to alleviate a problem, in the existing technology, that payment processing cannot be performed in an offline state.

The present specification provides a payment device for offline payment, including one or more memories and processors, where the memory stores a program, and the program is executed by the one or more processors to perform the following steps: when both a collection device and the payment device are in an offline state, receiving, by the payment device through a communication connection established to the collection device, payment data sent by the collection device; performing payment processing based on the payment data and account information of the payment device, to obtain a payment result; and returning the payment result to the collection device, so that the collection device performs collection processing based on the payment result and obtained account information of the payment device, to obtain a collection result.

The present specification provides an offline payment method, to alleviate a problem, in the existing technology, that payment processing cannot be performed in an offline state.

The present specification provides an offline payment method, including: receiving, by a server, a payment record sent by a payment device when in an online state and a collection record sent by a collection device when in an online state, where the payment record is generated by executing a payment service with the collection device by the payment device when both the payment device and the collection device are in an offline state, and the collection record is generated by executing a collection service with the payment device by the collection device when both the collection device and the payment device are in the offline state; and performing service check based on the payment record and the collection record.

The present specification provides an offline payment apparatus, to alleviate a problem, in the existing technology, that payment processing cannot be performed in an offline state.

The present specification provides an offline payment apparatus, including: a receiving module, configured to receive a payment record sent by a payment device when in an online state and a collection record sent by a collection device when in an online state, where the payment record is generated by executing a payment service with the collection device by the payment device when both the payment device and the collection device are in an offline state, and the collection record is generated by executing a collection service with the payment device by the collection device when both the collection device and the payment device are in the offline state; and a check module, configured to perform service check based on the payment record and the collection record.

The present specification provides a server for offline payment, to alleviate a problem, in the existing technology, that payment processing cannot be performed in an offline state.

The present specification provides a server for offline payment, including one or more memories and processors, where the memory stores a program, and the program is executed by the one or more processors to perform the following steps: receiving a payment record sent by a payment device when in an online state and a collection record sent by a collection device when in an online state, where the payment record is generated by executing a payment service with the collection device by the payment device when both the payment device and the collection device are in an offline state, and the collection record is generated by executing a collection service with the payment device by the collection device when both the collection device and the payment device are in the offline state; and performing service check based on the payment record and the collection record.

The present specification provides a service processing method, to alleviate a problem, in the existing technology, that service processing cannot be performed in an offline state.

The present specification provides a service processing method, including: establishing a communication connection between a service device and an end-user device when both the service device and the end-user device are in an offline state; sending, by the service device, service data to the end-user device through the communication connection; performing, by the end-user device, service processing based on the service data and account information of the end-user device, to obtain a first service result; returning, by the end-user device, the first service result to the service device through the communication connection; and performing, by the service device, service processing based on the first service result and obtained account information of the end-user device, to obtain a second service result.

The present specification provides a payment processing method, to alleviate a problem, in the existing technology, that service processing cannot be performed in an offline state.

The present specification provides a payment processing method, including: establishing a communication connection between a service device and an end-user device when both the service device and the end-user device are in an offline state; sending, by the service device, service data to the end-user device through the communication connection; generating, by the end-user device, a first service record based on the service data and account information of the end-user device; sending, by the end-user device, the first service record to the service device; generating, by the service device, a second service record based on the first service record and obtained account information; sending, by the end-user device, the first service record to a server when the end-user device is in an online state; sending, by the service device, the second service record to the server when the service device is in an online state; and performing, by the server, service processing based on the first service record and the second service record.

The present specification provides a payment processing method, to alleviate a problem, in the existing technology, that service processing cannot be performed in an offline state.

The present specification provides a payment processing method, including: establishing a communication connection between a service device and an end-user device when both the service device and the end-user device are in an offline state; sending service data to the end-user device through the communication connection; receiving a returned first service record generated by the end-user device based on the service data and account information of the end-user device; generating a second service record based on the first service record and obtained account information of the end-user device; and sending the second service record to a server when in an online state, so that the server performs service processing based on the second service record and the first service record sent by the end-user device when in an online state.

The present specification provides a payment processing apparatus, to alleviate a problem, in the existing technology, that service processing cannot be performed in an offline state.

The present specification provides a payment processing apparatus, including: a connection establishment module, configured to establish a communication connection between the apparatus and an end-user device when both the apparatus and the end-user device are in an offline state; a first sending module, configured to send service data to the end-user device through the communication connection; a receiving module, configured to receive a returned first service record generated by the end-user device based on the service data and account information of the end-user device; a generation module, configured to generate a second service record based on the first service record and obtained account information of the end-user device; and a second sending module, configured to send the second service record to a server when in an online state, so that the server performs service processing based on the second service record and the first service record sent by the end-user device when in an online state.

The present specification provides a payment processing device, to alleviate a problem, in the existing technology, that service processing cannot be performed in an offline state.

The present specification provides a payment processing device, including one or more memories and processors, where the memory stores a program, and the program is executed by the one or more processors to perform the following steps: establishing a communication connection between the device and an end-user device when both the device and the end-user device are in an offline state; sending service data to the end-user device through the communication connection; receiving a returned first service record generated by the end-user device based on the service data and account information of the end-user device; generating a second service record based on the first service record and obtained account information of the end-user device; and sending the second service record to a server when in an online state, so that the server performs service processing based on the second service record and the first service record sent by the end-user device when in an online state.

The present specification provides a payment processing method, to alleviate a problem, in the existing technology, that service processing cannot be performed in an offline state.

The present specification provides a payment processing method, including: when both a service device and an end-user device are in an offline state, receiving, by the end-user device through a communication connection established to the service device, service data sent by the service device; generating a first service record based on the service data and account information of the end-user device; returning the first service record to the service device, so that the service device generates a second service record based on the first service record and obtained account information of the end-user device; and sending the first service record to a server when in an online state, so that the server performs service processing based on the first service record and the second service record sent by the service device when in an online state.

The present specification provides a payment processing apparatus, to alleviate a problem, in the existing technology, that service processing cannot be performed in an offline state.

The present specification provides a payment processing apparatus, including: a receiving module, configured to: when both a service device and the apparatus are in an offline state, receive, through a communication connection established to the service device, service data sent by the service device; a generation module, configured to generate a first service record based on the service data and account information of the apparatus; a return module, configured to return the first service record to the service device, so that the service device generates a second service record based on the first service record and obtained account information of the apparatus; and a sending module, configured to send the first service record to a server when in an online state, so that the server performs service processing based on the first service record and the second service record sent by the service device when in an online state.

The present specification provides a payment processing end-user device, to alleviate a problem, in the existing technology, that service processing cannot be performed in an offline state.

The present specification provides a payment processing end-user device, including one or more memories and processors, where the memory stores a program, and the program is executed by the one or more processors to perform the following steps: when both a service device and the end-user device are in an offline state, receiving, by the end-user device through a communication connection established to the service device, service data sent by the service device; generating a first service record based on the service data and account information of the end-user device; returning the first service record to the service device, so that the service device generates a second service record based on the first service record and obtained account information of the end-user device; and sending the first service record to a server when in an online state, so that the server performs service processing based on the first service record and the second service record sent by the service device when in an online state.

The present specification provides a payment processing method, to alleviate a problem, in the existing technology, that service processing cannot be performed in an offline state.

The present specification provides a payment processing method, including: receiving, by a server, a first service record sent by an end-user device when in an online state and a second service record sent by a service device when in an online state, where the first service record is generated by executing a service with the service device by the end-user device when both the end-user device and the service device are in an offline state, and the second service record is generated by executing the service with the end-user device by the service device when both the service device and the end-user device are in the offline state; and performing service processing based on the first service record and the second service record.

The present specification provides a payment processing apparatus, to alleviate a problem, in the existing technology, that service processing cannot be performed in an offline state.

The present specification provides a payment processing apparatus, including: a receiving module, configured to receive a first service record sent by an end-user device when in an online state and a second service record sent by a service device when in an online state, where the first service record is generated by executing a service with the service device by the end-user device when both the end-user device and the service device are in an offline state, and the second service record is generated by executing the service with the end-user device by the service device when both the service device and the end-user device are in the offline state; and a processing module, configured to perform service processing based on the first service record and the second service record.

The present specification provides a payment processing server, to alleviate a problem, in the existing technology, that service processing cannot be performed in an offline state.

The present specification provides a payment processing server, including one or more memories and processors, where the memory stores a program, and the program is executed by the one or more processors to perform the following steps: receiving a first service record sent by an end-user device when in an online state and a second service record sent by a service device when in an online state, where the first service record is generated by executing a service with the service device by the end-user device when both the end-user device and the service device are in an offline state, and the second service record is generated by executing the service with the end-user device by the service device when both the service device and the end-user device are in the offline state; and performing service processing based on the first service record and the second service record.

The at least one technical solution used in the present specification can achieve the following beneficial effects:

In the one or more implementations of the present specification, when both the collection device and the payment device are in the offline state, the collection device can send the payment data to the payment device through the communication connection established to the payment device, so that the payment device can perform payment processing based on the payment data, to obtain the payment result, and return the payment result to the collection device, and the collection device can perform collection processing based on the payment result and the obtained account information of the payment device, to obtain the collection result. When in the offline state, the payment device and the collection device can send data to each other through the communication connection established between the payment device and the collection device, and make an offline payment. As such, even if a payment device held by a user is in an offline state, the user can still make an offline payment by using the payment device, bringing convenience the user.

BRIEF DESCRIPTION OF DRAWINGS

The accompanying drawings described here are intended to provide a further understanding of the present specification, and constitute a part of the present specification. The illustrative implementations of the present specification and descriptions thereof are intended to describe the present specification, and constitute no limitation on the present specification. In the accompanying drawings.

DESCRIPTION OF IMPLEMENTATIONS

Figure 1:
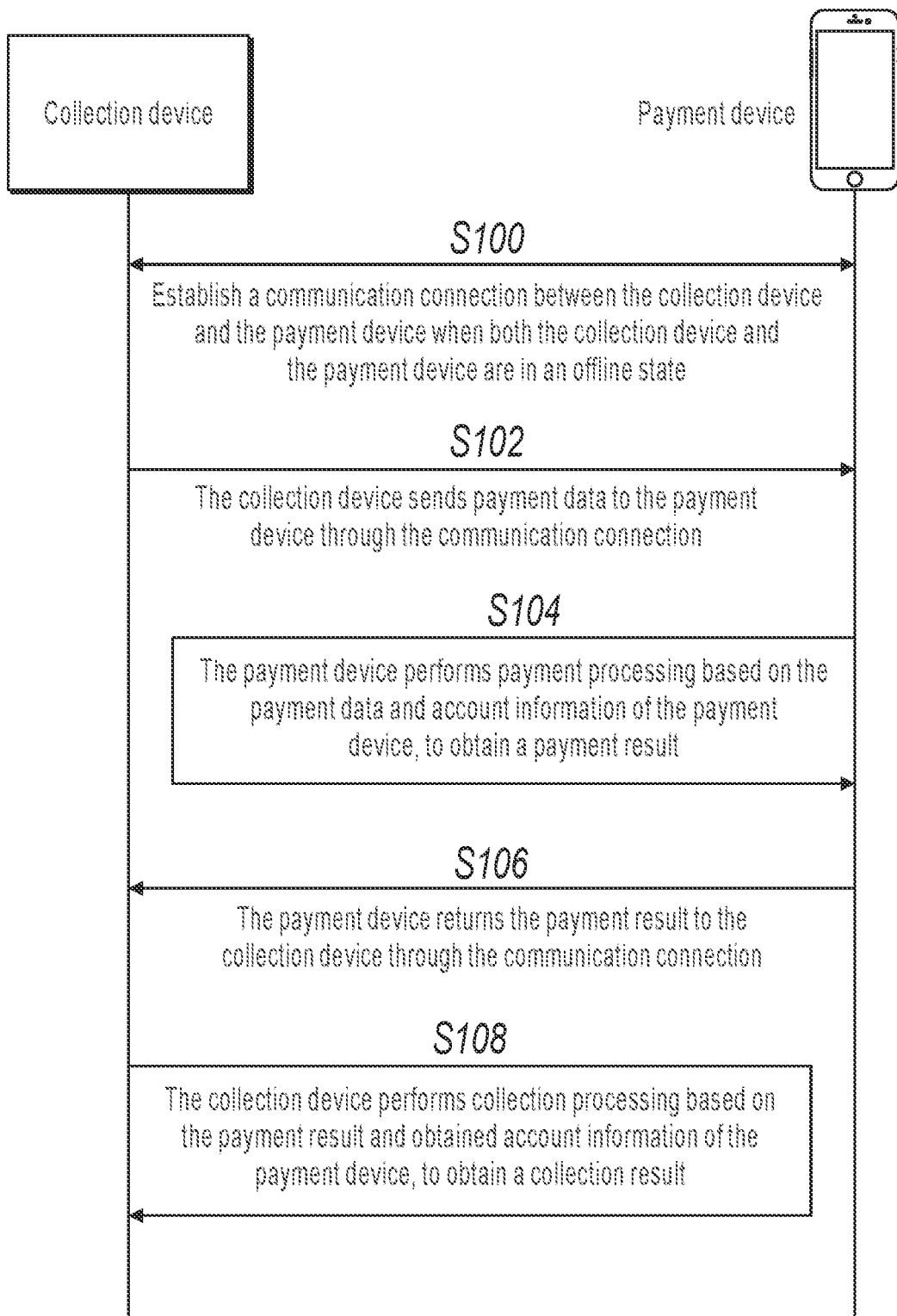
FIG. 1 is a schematic diagram illustrating an offline payment process, according to the present specification.

In the existing technology, a user usually makes a payment by using an end-user device when the end-user device is in an online state, and cannot make a payment once the end-user device is in an offline state. For example, when a user initiates a transfer service to another user, an end-user device used by the user who initiates the transfer service usually needs to be in an online state. As such, the user who initiates the transfer service can send a transfer request to a server by using the end-user device, and complete the transfer service by using the server. Once the end-user device of the user who initiates the transfer service is in an offline state, the user cannot send the transfer request to the server by using the end-user device, and consequently cannot execute the transfer service.

To effectively alleviate the previous problem to enable a user to make a payment in an offline state, the present specification provides an offline payment method. When both a collection device and a payment device are in an offline state, the collection device can send payment data to the payment device through a communication connection established to the payment device, so that the payment device can perform payment processing based on the payment data, to obtain a payment result, and return the payment result to the collection device, and the collection device can perform collection processing based on the payment result and obtained account information of the payment device, to obtain a collection result.

When in the offline state, the payment device and the collection device can send data to each other through the communication connection established between the payment device and the collection device, and make an offline payment. As such, even if both a payment device held by a user and a collection device that makes an offline payment with the payment device are in an offline state, the user can still make an offline payment by using the payment device, bringing convenience to the user.

In the present specification, the collection device can be an intelligent end-user device such as a smartphone or a tablet computer, or can be a device that executes a specific collection service, for example, an electronic charge device on a bus or an electronic scanning charge device in a supermarket. The payment device mentioned in the present specification can also be an intelligent end-user device such as a smartphone or a tablet computer, or can be some dedicated devices that execute a collection service.

Certainly, the offline payment made by the collection device and the payment device can be completed by using clients in the collection device and the payment device. To be specific, a client for executing a payment service is installed in each of the collection device and the payment device, and the collection device and the payment device can complete the offline payment by running respective clients.

To make a person skilled in the art understand the technical solutions in one or more implementations of the present specification better, the following clearly and comprehensively describes the technical solutions in the one or more implementations of the present specification with reference to the accompanying drawings in the one or more implementations of the present specification. Apparently, the described implementations are merely some but not all of the implementations of the present specification. All other implementations obtained by a person of ordinary skill in the art based on the implementations of the present specification without creative efforts shall fall within the protection scope of the present specification.

Implementation 1

FIG. 1 is a schematic diagram illustrating an offline payment process, according to the present specification. The process includes the following steps.

S100. Establish a communication connection between a collection device and a payment device when both the collection device and the payment device are in an offline state.

In the present specification, the communication connection can be established between the collection device and the payment device when both the collection device and the payment device are in the offline state, so that the collection device and the payment device exchange data with each other through the communication connection, and make an offline payment. The payment device can actively establish a communication connection to the collection device. For example, a Bluetooth connection is to be established between the collection device and the payment device. The collection device can continuously externally broadcast a broadcast data packet that includes a device name and a device address. After obtaining the broadcast data packet, the payment device can determine, based on the device name and the device address that are included in the broadcast data packet, the collection device that can establish a Bluetooth connection to the payment device, and then can establish a Bluetooth connection to the collection device based on a connection operation performed by a user on the payment device.

Alternatively, the collection device can initiate a communication connection establishment request to the payment device, and establish a communication connection to the payment device when determining that the payment device agrees to establish a communication connection. That a Bluetooth connection is to be established between the collection device and the payment device is still used as an example. The payment device can broadcast a broadcast data packet that includes a payment device name and a payment device address of the payment device. After obtaining the broadcast data packet broadcast by the payment device, the collection device can send the communication connection establishment request to the payment device based on the payment device name and the payment device address in the broadcast data packet. The payment device can display the request to a user, and return connection confirmation information to the collection device after determining that the user performs a connection confirmation operation, so that the collection device establishes a communication connection to the payment device based on the information.

Certainly, the communication connection can be established between the collection device and the payment device in another way. For example, the collection device can scan a two-dimensional code displayed by the payment device, identify a payment device name and a payment device address of the payment device from the two-dimensional code, and then establish a Bluetooth connection to the payment device based on the identified payment device name and payment device address. Details are omitted here for simplicity.

In the present specification, the communication connection established between the collection device and the payment device can be in a plurality of forms such as Bluetooth, infrared, ZigBee, and near field communication (NFC).

During service processing, the collection device can obtain account information of the user from the payment device. The account information mentioned here can be information, used by the user to make an offline payment, such as a user account, an identity card, or a mobile phone number. The collection device can obtain the account information from the payment device in a plurality of ways. For example, the payment device can display a two-dimensional code of the user, and the two-dimensional code includes the account information of the user. The collection device can scan the two-dimensional code displayed by the payment device, and identify and obtain the account information of the user from the two-dimensional code.

Alternatively, the collection device can obtain the account information of the user from the payment device by establishing a communication connection to the payment device. For example, assume that an NFC chip is installed in the payment device, and the NFC chip records the account information of the user. In this case, the collection device can obtain the account information by establishing an NFC connection to the payment device. To be specific, the collection device can obtain the account information of the user from the NFC chip in the payment device by using an NFC reader/writer installed in the collection device.

Certainly, the collection device can obtain the account information of the user from the payment device in another way. Details are omitted here for simplicity.

S102. The collection device sends payment data to the payment device through the communication connection.

The collection device can send the payment data to the payment device through the communication connection established to the payment device. The collection device can send the payment data to the payment device through the communication connection in a one-to-one connection way. For example, a Bluetooth connection is used as an example. The collection device ends a Bluetooth connection to another payment device after establishing a Bluetooth connection to the payment device. The collection device can send the payment data to the payment device through the Bluetooth connection established to the payment device. The collection device can end the established Bluetooth connection after completing the offline payment with the payment device, so that another payment device establishes a one-to-one Bluetooth connection to the collection device to make an offline payment.

Certainly, the collection device can send the payment data to the payment device in a one-to-many connection way. For example, before sending the payment data to the payment device, the collection device can first obtain account information of the payment device, and then the collection device can broadcast the payment data by adding the payment data that includes account information of the payment device to a Bluetooth signal. When obtaining the Bluetooth signal that includes the payment data, the payment device can determine whether the account information included in the payment data is consistent with the account information obtained by the collection device from the payment device, and receive the payment data when determining that the account information included in the payment data is consistent with the account information obtained by the collection device from the payment device.

S104. The payment device performs payment processing based on the payment data and account information of the payment device, to obtain a payment result.

After receiving the payment data sent by the collection device, the payment device can determine, based on the payment data, an amount that needs to be paid by the payment device, and perform payment processing based on the account information of the payment device and the amount, to obtain the corresponding payment result.

After receiving the payment data, the payment device can determine, based on the payment data, the amount that needs to be paid by the payment device, and further determine whether an account corresponding to the account information of the payment device includes an amount not less than the amount. When determining that the amount in the account is not less than the amount that needs to be paid by the payment device, the payment device deducts the amount that needs to be paid by the payment device from the amount in the account, and generates a payment result indicating that the amount is successfully deducted from the account of the payment device after successfully deducting the amount.

For example, assume that user C needs to pay 60 RMB to user D. In this case, a collection device of user D can establish a communication connection to a payment device of user C, and send payment data to the payment device of user C through the communication connection. The payment data includes account information of user D and the payment amount 60 RMB that needs to be paid by user C this time.

The payment device of user C determines the payment amount from the payment data, and determines whether an account of user C includes an amount not less than the payment amount. When determining that the amount in the account of user C is not less than the payment amount, the payment device can deduct the payment amount from the account of user C, and generate a payment result indicating that the amount is successfully deducted.

The account of the payment device and an account of the collection device that are mentioned in the present specification are offline electronic accounts used by the payment device and the collection device to make an offline payment. The offline electronic account can be an independent account, and the offline electronic account can be used by a user to execute a transaction in an offline state. An amount in the offline electronic account can be transferred from an online electronic account of the user to the offline electronic account by using a transfer operation performed by the user.

When a payment device used by the user is in an online state, the user can perform, on the payment device, an operation of transferring a specified amount in the online electronic account of the user to the offline electronic account. The payment device can generate a corresponding transfer request based on the transfer operation performed by the user, and send the transfer request to a server. The server can determine a to-be-transferred amount involved in the transfer request, and transfer the to-be-transferred amount from the online electronic account of the user to the offline electronic account of the user. This process can be considered as recharging the offline electronic account. Correspondingly, the specified amount and the to-be-transferred amount mentioned here can be considered as recharge amounts, and the transfer request can be considered as a recharge request. As such, the user can directly execute a transaction in the offline state by using the offline account.

Certainly, the collection device mentioned in the present specification can also recharge an offline electronic account of the collection device by using an online electronic account of the collection device. A specific process is basically the same as the previously described process in which the payment device recharges the offline electronic account of the payment device. Details are omitted here for simplicity.

S106. The payment device returns the payment result to the collection device through the communication connection.

S108. The collection device performs collection processing based on the payment result and obtained account information of the payment device, to obtain a collection result.

The payment device can return the payment result to the collection device after generating the payment result. The collection device can generate the collection result based on the payment result and the obtained account information of the payment device. The payment device can return the payment result to the collection device through the communication connection established to the collection device. The collection device can determine, based on the payment result, the amount that needs to be paid by the payment device, that is included in the payment data, and that is successfully deducted by the payment device from the account of the payment device, add the amount to an account corresponding to account information of the collection device, and generate a collection result indicating a collection success.

In the previous example, after receiving the payment result from the payment device, the collection device can determine that the payment device successfully deducts 60 RMB from the offline electronic account of user C. In this case, the collection device can add the corresponding amount 60 RMB to an offline electronic account of the collection device, and generate a collection result indicating a collection success.

It is worthwhile to note that other than information indicating a payment success, the previously mentioned payment result alternatively includes information indicating a payment failure. To be specific, when failing to deduct the amount that needs to be paid by the payment device from the account of the payment device, the payment device can generate a payment result indicating a payment failure. Correspondingly, when the payment device returns the payment result indicating a payment failure to the collection device through the communication connection, the collection device can determine, based on the payment result, that the payment device fails to pay the corresponding amount, and then generate information indicating that the amount fails to be added to the account of the collection device, namely, the collection result.

In the present specification, the collection device can generate a collection record based on a determined amount actually paid by the payment device, the account information of the collection device, the obtained account information of the payment device, and a collection time at which the collection device collects the amount, and upload the collection record to the server in a subsequent process, so that the server checks, based on the collection record uploaded by the collection device when in an online state and a payment record uploaded by the payment device when in an online state, the offline payment made by the payment device and the collection device, to ensure accuracy of the payment service. The payment device can generate the payment record based on the determined amount actually paid by the payment device, the account information of the payment device, obtained account information of the collection device, and a payment time at which the payment device pays the amount.

For the amount, actually paid by the payment device, based on which the collection record is generated, the collection device can determine, based on the payment data sent to the payment device, the amount actually paid by the payment device, or can determine, based on the payment result returned by the payment device, the amount actually paid by the payment device.

In addition to the account information of the payment device, the account information of the collection device, the payment amount, and the payment time, the payment record can include other information such as a payment order number (the payment order number can be generated by using a predetermined algorithm in the offline state) and a device number. Similarly, the collection record can also include other information.

It is worthwhile to note that in the present specification, the collection device can obtain the account information of the payment device on a plurality of occasions. The collection device can obtain the account information of the payment device before step S100. For example, the payment device can display a digital object identifier (DOI) (for example, a two-dimensional code or a barcode that includes the account information of the payment device) of the account information of the payment device to the collection device. The collection device can identify and obtain the account information of the payment device from the DOI, and then the collection device establishes the communication connection to the payment device.

The collection device can obtain the account information of the payment device from the payment device through the communication connection after establishing the communication connection to the payment device. For example, after establishing the communication connection to the payment device, the collection device can send, through the communication connection, a request for obtaining the account information of the payment device to the payment device. The payment device can send the account information of the payment device to the collection device based on the request.

The collection device can alternatively obtain the account information of the payment device from the payment result by using the payment result returned by the payment device in step S106. The collection device can obtain the account information of the payment device on many other occasions. Details are omitted here for simplicity.

Similarly, the payment device needs to obtain the account information of the collection device when generating the payment record. The payment device can obtain the account information of the collection device on many occasions. The payment device can obtain the account information of the collection device from the collection device through the communication connection after establishing the communication connection to the collection device. The payment device can alternatively obtain the account information of the collection device by using the payment data sent by the collection device. Alternatively, in a process of establishing the communication connection to the payment device, the collection device can broadcast a signal that includes the account information of the collection device, a device name of the collection device, and a device address of the collection device. After obtaining the signal, the payment device can establish the communication connection to the collection device based on the device address and the device name of the collection device that are included in the signal, and obtain the account information of the collection device from the signal. Certainly, the payment device can obtain the account information of the collection device on another occasion. Details are omitted here for simplicity.

To ensure service accuracy, the server needs to check the payment service executed by the collection device and the payment device in the offline state. Therefore, when in the online state, the collection device needs to send the collection record saved by the collection device to the server. Similarly, when in the online state, the payment device needs to send the payment record saved by the payment device to the server. The server can check, based on the payment record and the collection record, the offline payment service executed by the user. To be specific, the server checks whether content recorded in the payment record is consistent with content recorded in the collection record, to ensure service accuracy.

The server can determine, by determining whether the payment record and the collection record satisfy the following conditions, whether the payment record matches the collection record:

1. The amount that is actually paid by the payment device and that is included in the payment record is the same as the amount that is actually collected by the collection device and that is included in the collection record;

2. The account information of the payment device that is included in the payment record is the same as the account information of the payment device that is included in the collection record;

3. The account information of the collection device that is included in the payment record is the same as the account information of the collection device that is included in the collection record; and 4. A difference between the payment time at which the payment device pays the amount and that is included in the payment record and the collection time at which the collection device collects the amount and that is included in the collection record is not greater than a specified value.

When determining that both the payment record and the collection record satisfy the previous conditions, the server determines that the payment record matches the collection record. The server can determine that the payment record does not match the collection record when any one of the conditions is not satisfied.

When determining that the payment record matches the collection record, the server can determine that no problem occurs in the offline payment service previously executed by the collection device and the payment device. When determining that the payment record does not match the collection record, the server can separately determine a credit limit corresponding to the account information of the collection device and a credit limit corresponding to the account information of the payment device. The server can adjust at least one of an amount in the account of the collection device and an amount in the account of the payment device based on a payment record or a collection record sent by a device that corresponds to account information corresponding to the highest credit limit.

For example, assume that the content of the collection record sent by the collection device to the server is: 2017-7-23, payee: account A (the account information of the collection device), payer: account B (the account information of the payment device), and collection amount: 13, and the content of the payment record sent by the payment device to the server is: 2017-7-23, payee: account A, payer: account B, and payment amount: 15. When determining that the payment record does not match the collection record, the server can separately determine a credit limit corresponding to account A and a credit limit corresponding to account B, and compare the two determined credit limits. When determining that the credit limit of account A in the two credit limits is higher, the server can adjust an amount in account B based on the collection record sent by the collection device.

Certainly, when determining that the payment record does not match the collection record, the server can perform service adjustment in another way. For example, when the collection device and the payment device are in the online state, the server can separately determine an amount included in the account of the collection device and an amount included in the account of the payment device. The server can check the amount in the account of the collection device based on the payment record and a transaction record (which can include a payment record generated by making a payment to another payment device, and can further include a collection record generated by collecting an amount from another payment device) generated by executing a transaction with the other payment device by the collection device. Similarly, the server can check the amount in the account of the payment device based on the collection record and a transaction record generated by executing a transaction with another collection device or payment device by the payment device. When determining that an amount that is in the account of the collection device and that is calculated by using the payment record and the transaction record generated by executing a transaction with the other payment device by the collection device is inconsistent with the actual amount in the account of the collection device, the server can adjust the actual amount in the account of the collection device based on the calculated amount. The server can also adjust the amount in the account of the payment device in this way.

When the payment record does not match the collection record, the server can alternatively separately determine reliability of the payment device and the collection device, and then perform service adjustment based on the determined reliability. The server can determine, based on transaction records that are sent by the collection device when in the online state and that are generated by executing transactions with payment devices and transaction records that are sent to the server by the payment devices when in the online state and that are generated by executing transactions with the collection device, the number of transactions that is consistent with the transaction records, and then determine the reliability (the reliability can be reliability corresponding to the account information of the collection device) of the collection device based on the total number of transactions executed with the payment devices by the collection device and the determined number of transactions that is consistent with the transaction records. A larger value of the number of transactions that is consistent with the transaction records indicates higher reliability. Similarly, the server can determine the reliability (the reliability can be reliability corresponding to the account information of the payment device) of the payment device in this way.

After separately determining the reliability of the collection device and the reliability of the payment device, the server can compare the reliability of the collection device and the reliability of the payment device, and adjust at least one of the amount in the account of the collection device and the amount in the account of the payment device based on a transaction record (a payment record or a collection record) sent by a party with the higher reliability. Certainly, the server can perform service adjustment in many other ways. Alternatively, the server can perform service adjustment in a manual analysis way. Details are omitted here for simplicity.

Certainly, the payment record and the collection record each can further include other information such as a transaction order number. Therefore, when determining whether the payment record matches the collection record, the server can compare all pieces of information included in the payment record and the collection record. When determining that all the pieces of information in the payment record and the collection record are the same, the server can determine that the payment record matches the collection record. Otherwise, the server can determine that the payment record does not match the collection record.

It is worthwhile to note that the service check can be alternatively performed by an end-user device responsible for check, or can be performed by a system. A specific check method is the same as the previous check method, and details are omitted here for simplicity.

The previously mentioned payment time included in the payment record can alternatively be a time at which the payment device receives the payment data, and correspondingly, the collection time included in the collection record can be a time at which the collection device sends the payment data. Certainly, the payment time and the collection time each can be another time. Details are omitted here for simplicity.

It can be seen from the previous method that when in the offline state, the payment device and the collection device can send data to each other through the communication connection established between the payment device and the collection device, and make an offline payment. As such, even if both a payment device held by a user and a collection device that makes an offline payment with the payment device are in an offline state, the user can still make an offline payment by using the payment device, bringing convenience to the user.

It is worthwhile to note that in the process of describing the service processing method provided in the present specification, the service processing method is described above by using an offline payment scenario in which the payment device is a payer and the collection device is a payee. However, the offline payment method provided in the present specification is also applicable to an offline payment scenario in which the payment device is a payee and the collection device is a payer. To be specific, the payment data sent by the collection device to the payment device through the communication connection includes an amount that needs to be collected by the payment device. The payment device can add the amount to the account of the payment device based on the payment data, and return a collection result indicating a collection success to the collection device. After determining, based on the collection result, that the payment device successfully collects the amount, the collection device can deduct the amount from the account of the collection device, and then generate a payment result indicating a payment (or referred to as deduction) success.

Certainly, the collection device can first deduct, from the account of the collection device, the amount that needs to be collected by the payment device, and then send, to the payment device through the communication connection established to the payment device, the payment data that includes the amount that needs to be collected by the payment device, so that the payment device can add the amount to the account of the payment device based on the obtained payment data.

The offline payment method provided in the present specification can be performed based on a complete credit system. To be specific, an offline electronic account can be opened for a collection device or a payment device only when a credit limit of a user reaches a certain degree (for example, greater than a specified credit limit). As such, security and accuracy of an offline payment made by the collection device and the payment device can be effectively ensured. Certainly, if account information of the collection device or account information of the payment device corresponds to a trustworthy organization, the offline electronic account can also be opened.

Figure 2:
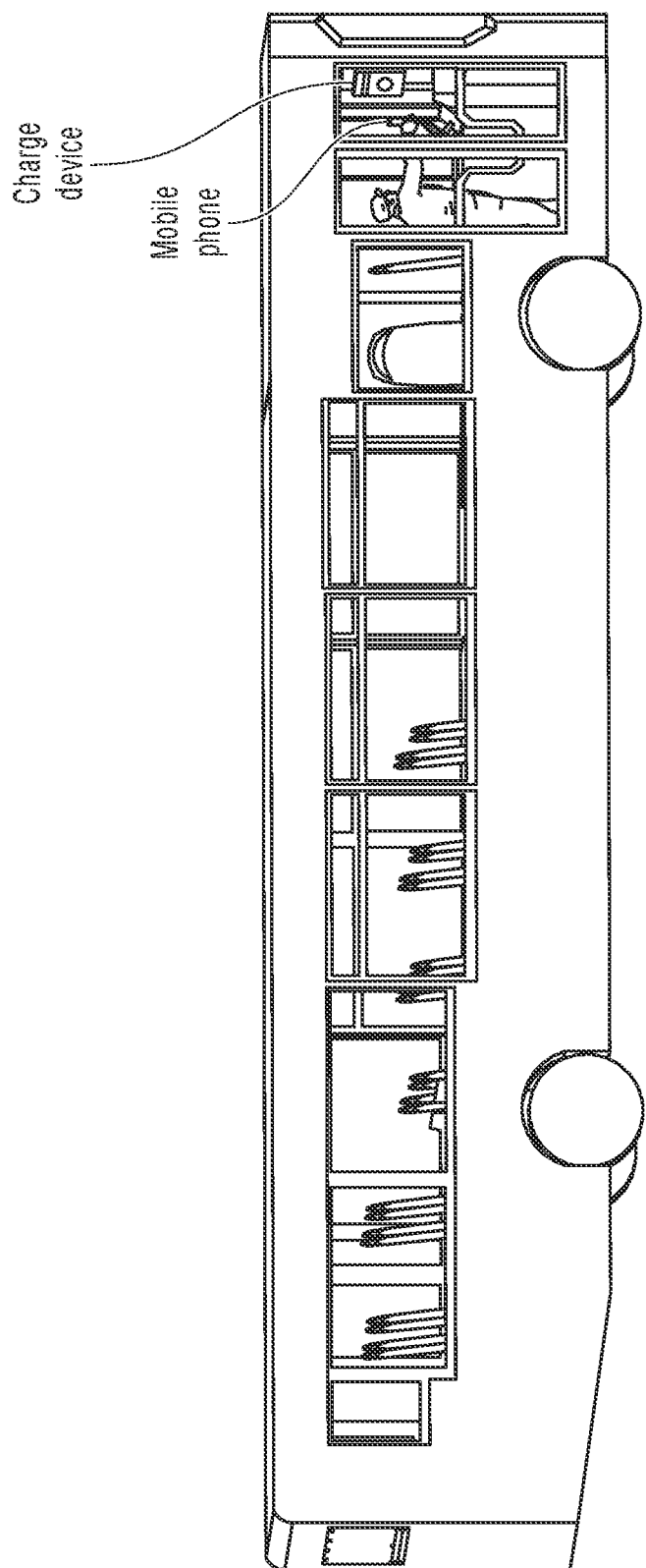
FIG. 2 is a schematic diagram illustrating paying a fare in an offline payment way by a user to take a bus, according to the present specification.

To further describe the offline payment method provided in the present specification, a scenario in which a user pays a fare to take a bus is used to provide detailed description, as shown in FIG. 2.

FIG. 2 is a schematic diagram illustrating paying a fare in an offline payment way by a user to take a bus, according to the present specification.

Before taking the bus, the user can recharge, in an online state, an offline electronic account of the user by using a mobile phone (namely, the payment device), to make an offline payment in an offline state. When taking the bus, the user enables a Bluetooth connection of the mobile phone, and searches for a broadcast packet that is broadcast by a charge device (namely, the previous collection device) on the bus and that includes a name of the charge device and an address of the charge device, so that a Bluetooth connection is established between the mobile phone and the charge device by using the identified broadcast packet.

The user can display a two-dimensional code of the user to the charge device by using the mobile phone. The charge device can identify account information of the user from the two-dimensional code, and then send deduction data (namely, the payment data) to the mobile phone through the Bluetooth connection established to the mobile phone. The deduction data includes account information of the charge device and a deduction amount.

After receiving the deduction data, the mobile phone can determine the deduction amount from the deduction data, and further determine whether an amount in the offline electronic account of the user is not less than the deduction amount. If yes, the mobile phone deducts the deduction amount from the offline electronic account, generates a deduction success result (namely, the payment result), and generates a deduction record (namely, the payment record) based on account information of the user, the account information of the charge device, and the deduction amount. If no, the mobile phone generates a deduction failure result.

The mobile phone can return the generated result (namely, the payment result) to the charge device. After determining, based on the received result, that the amount is successfully deducted from the offline electronic account of the user, the charge device can add the deduction amount to an offline electronic account of the charge device, and generate a collection record based on the obtained account information, account information of the charge device, and the deduction amount.

The mobile phone and the charge device can save the deduction record and the collection record that are respectively generated by the mobile phone and the charge device. When in the online state, the mobile phone and the charge device respectively send the deduction record and the collection record that are respectively generated by the mobile phone and the charge device to the server, so that the server checks, by using the received deduction record and collection record, the payment previously made by the user to take the bus, to ensure accuracy of a payment service.

Implementation 2

Figure 3:
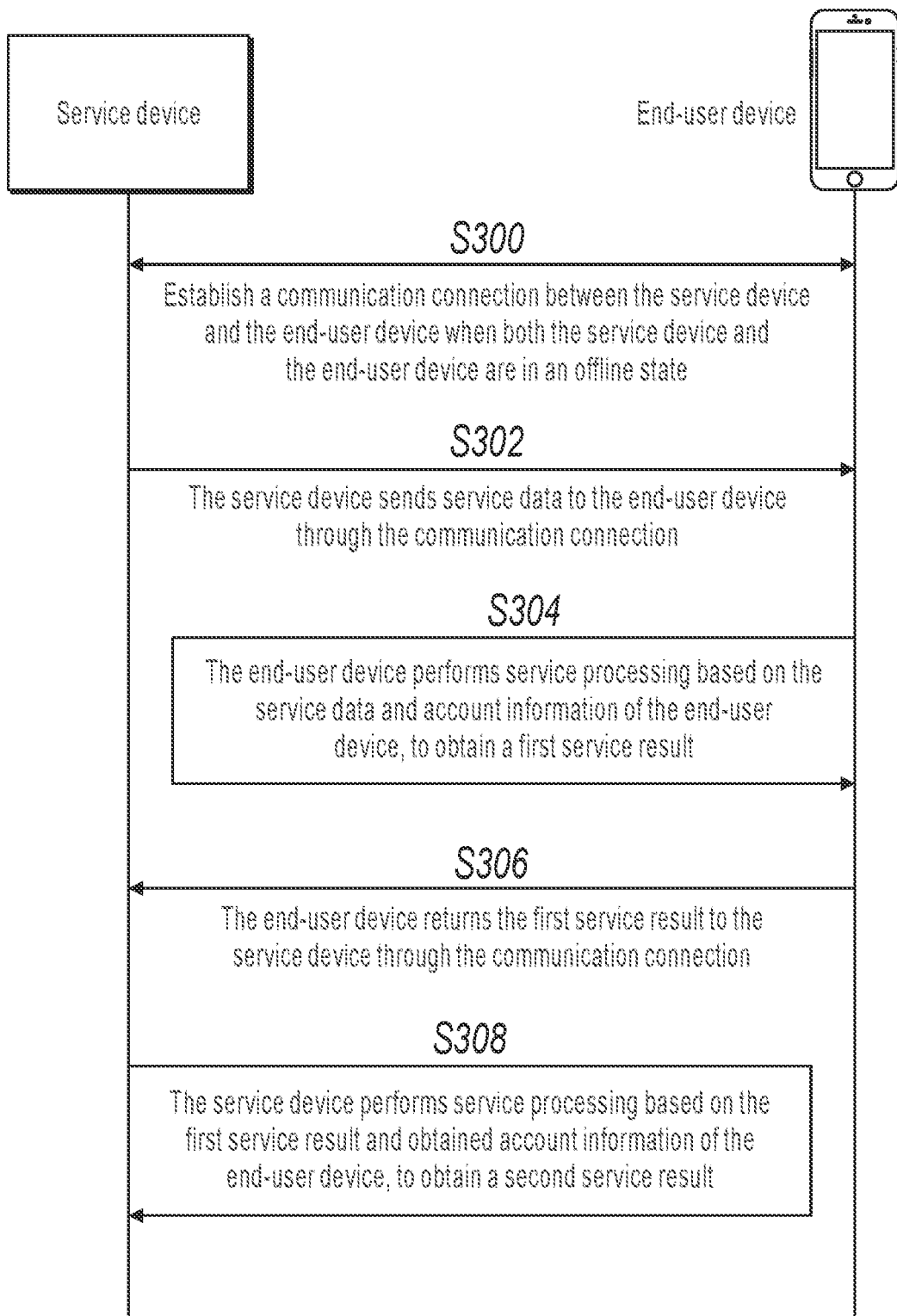
FIG. 3 is a schematic diagram illustrating a service processing process, according to the present specification.

FIG. 3 is a schematic diagram illustrating a service processing process, according to the present specification. The process includes the following steps.

S300. Establish a communication connection between a service device and an end-user device when both the service device and the end-user device are in an offline state.

S302. The service device sends service data to the end-user device through the communication connection.

S304. The end-user device performs service processing based on the service data and account information of the end-user device, to obtain a first service result.

S306. The end-user device returns the first service result to the service device through the communication connection.

S308. The service device performs service processing based on the first service result and obtained account information of the end-user device, to obtain a second service result.

In the service processing method provided in the present specification, the service device and the end-user device can perform service processing when both are in the offline state. For a specific process, references can be made to the process in the offline payment method described in Implementation 1. The service device is equivalent to the collection device in Implementation 1, the end-user device is equivalent to the payment device in Implementation 1, the service data is equivalent to the payment data in Implementation 1, the first service result is equivalent to the payment result in Implementation 1, and the second service result is equivalent to the collection result in Implementation 1.

The end-user device can generate a corresponding first service record based on the obtained service data, the account information of the end-user device, obtained account information of the service device, and a service processing time (for example, in a payment scenario, the end-user device can generate a payment record based on an amount actually paid by the end-user device, the account information of the end-user device, the obtained account information of the service device, and a payment time at which the end-user device pays the amount), and send the first service record to a server when the end-user device is in an online state.

Similarly, the service device can generate a corresponding second service record based on the service data, account information of the service device, the obtained account information of the end-user device, and a service processing time (for example, in the payment scenario, the service device can generate a collection record based on an amount actually collected by the service device, the obtained account information of the end-user device, the account information of the service device, and a collection time at which the service device collects the amount), and send the second service record to the server when the service device is in an online state.

After obtaining the first service record sent by the end-user device and the second service record sent by the service device, the server can check, based on the first service record and the second service record, the service processing performed by the service device and the end-user device. A specific check process is basically the same as the check process mentioned in Implementation 1, and details are omitted here for simplicity.

It is worthwhile to note that the service processing method mentioned in the present specification is not limited to the payment scenario, and is also applicable to another similar scenario. For example, in a process of adding a friend in an offline state, user A can scan, by using an end-user device, a two-dimensional code displayed by an end-user device of user B, to obtain account information of user B. User A can establish a communication connection to the end-user device of user B by using the end-user device, and send an offline friend addition request to the end-user device of user B (sending service data) through the communication connection. When determining, based on an operation performed by user B, that user B agrees with the friend addition request sent by user A, the end-user device of user B can establish an offline friend relationship with user B based on account information of user A that is included in the request, and temporarily add user A to a pending friend request list. The end-user device of user B can return an offline friend addition success message to the end-user device of user A, so that the end-user device of user A can determine, based on the message, that user B agrees to establish an offline friend relationship with user A, temporarily add user B to a pending friend request list, and chat based on the communication connection established between the two end-user devices. When the two end-user devices are in an online state, the server can finally complete a friend addition service based on friend addition records uploaded by the two end-user devices. Other service scenarios are similar to the two service scenarios listed above, and details are omitted here for simplicity.

Implementation 3

Figure 4:
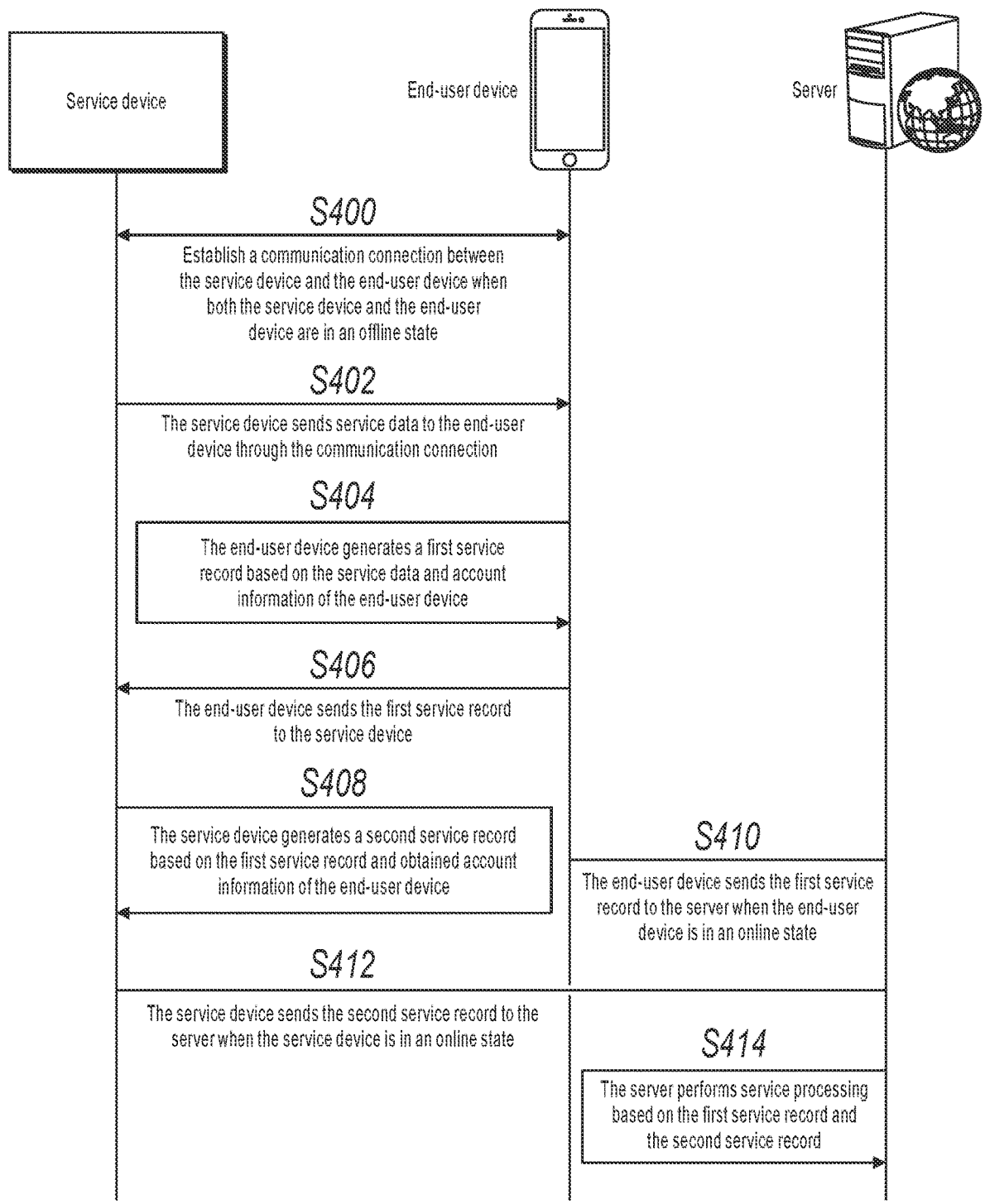
FIG. 4 is a schematic diagram illustrating a payment processing process, according to the present specification.

FIG. 4 is a schematic diagram illustrating a payment processing process, according to the present specification. The process includes the following steps.

S400. Establish a communication connection between a service device and an end-user device when both the service device and the end-user device are in an offline state.

S402. The service device sends service data to the end-user device through the communication connection.

S404. The end-user device generates a first service record based on the service data and account information of the end-user device.

S406. The end-user device sends the first service record to the service device.

S408. The service device generates a second service record based on the first service record and obtained account information of the end-user device.

Content of steps S400 to S408 is basically the same as the content of steps S100 to S108 in FIG. 1, and details are omitted here for simplicity. In step S404, the end-user device can directly generate the first service record based on the service data sent by the service device to the end-user device, account information of the service device, and the account information of the end-user device, instead of generating the payment record by first performing payment processing based on the payment data and the account information of the payment device, to obtain the payment result, as described in step S104. The end-user device can return the generated first service record to the service device, so that the service device generates the second service record based on the first service record and the obtained account information of the end-user device.

The end-user device returns the first service record to the service device, so that the service device determines that the end-user device has correspondingly recorded the current service. Certainly, after generating the first service record, the end-user device can return an acknowledgment message to the service device, so that the service device determines, based on the acknowledgment message, that the end-user device has correspondingly recorded the current service.

The service device can obtain the account information of the end-user device based on the first service record returned by the end-user device, and then generate the second service record based on an amount included in the service data, the account information of the end-user device, and account information of the service device. Different from determining the amount from the service data previously sent to the end-user device, the service device can determine the amount from the first service record. Different from obtaining the account information of the end-user device from the first service record, the service device can obtain the account information of the end-user device on another occasion. A specific case is similar to the occasion on which the service device obtains the account information of the end-user device in the previous implementation, and details are omitted here for simplicity.

S410. The end-user device sends the first service record to a server when the end-user device is in an online state.

S412. The service device sends the second service record to the server when the service device is in an online state.

S414. The server performs service processing based on the first service record and the second service record.

When in the online state, the service device can send the second service record to the server. Similarly, when in the online state, the end-user device can send the first service record to the server. The server can perform service processing based on the first service record and the second service record. The server can determine, based on amounts included in the first service record and the second service record, and account information of the two transaction parties, whether the first service record matches the second service record. When determining that the first service record matches the second service record, the server can deduct the amount from an account of the end-user device, and add the amount to an account of the service device. The account of the end-user device and the account of the service device mentioned here each can be an online electronic account. A way in which the server determines whether the first service record matches the second service record is basically the same as the way, described in Implementation 1, in which the server determines whether the payment record matches the collection record, and details are omitted here for simplicity.

When determining that the first service record does not match the second service record, the server can determine, based on a credit limit corresponding to the account information of the service device and a credit limit corresponding to the account information of the end-user device, how to execute the service. A specific way can be as follows: The server can perform service processing based on a service record sent by a device that corresponds to account information corresponding to the higher credit limit.

When determining that the first service record does not match the second service record, the server can perform service processing in another way. For example, the server can determine, based on reliability of the service device and reliability of the end-user device, a specific service record based on which service processing is performed. For another example, when determining that the first service record is inconsistent with the second service record, the server can separately obtain risk control information corresponding to the account information of the service device and risk control information corresponding to the account information of the end-user device. The server can determine a party with securer account information based on the two pieces of obtained risk control information, and then perform service processing based on a service record sent by a device corresponding to the securer account information. Certainly, the server may possibly not perform service processing when determining that the first service record does not match the second service record.

When the first service record does not match the second service record, the server can perform service processing in a plurality of ways. The previously listed ways are only some ways, and other ways are omitted here.

It is worthwhile to note that the service processing can be performed by an end-user device responsible for processing a service, or can be performed by a system. A specific processing way is the same as the previous way, and details are omitted here for simplicity.

When generating the first service record and the second service record, the end-user device and the service device can display the first service record and the second service record that are respectively generated by the end-user device and the service device, to facilitate user viewing. The end-user device and the service device can respectively display, to a user, the amounts, included in the service records respectively generated by the end-user device and the service device, in specific forms, as shown in FIG. 5A and FIG. 5B.

Figure 5A:
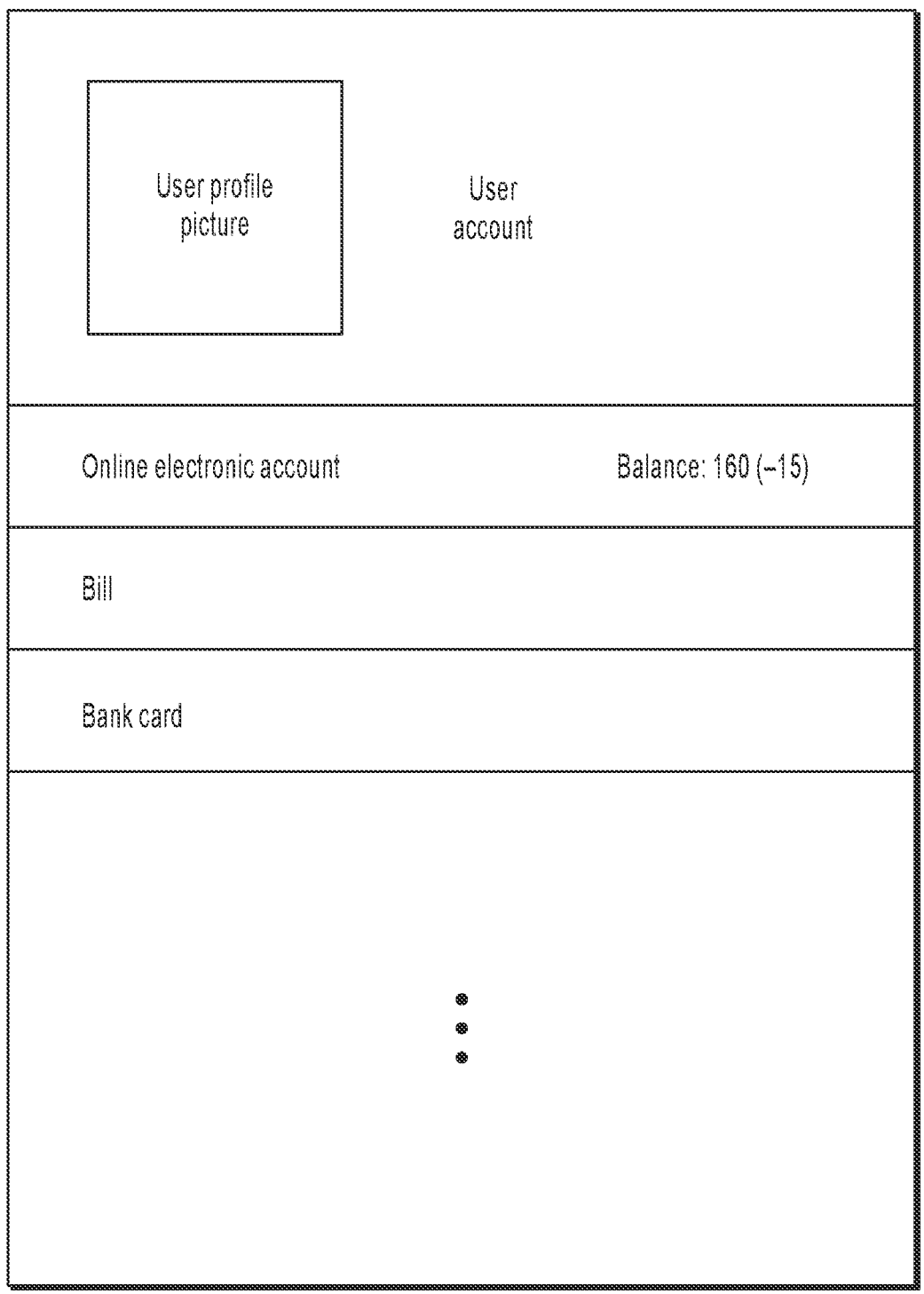
FIG. 5A and FIG. 5B are schematic diagrams illustrating displaying an amount in a first service record to a user by an end-user device, according to the present specification.
Figure 5B:
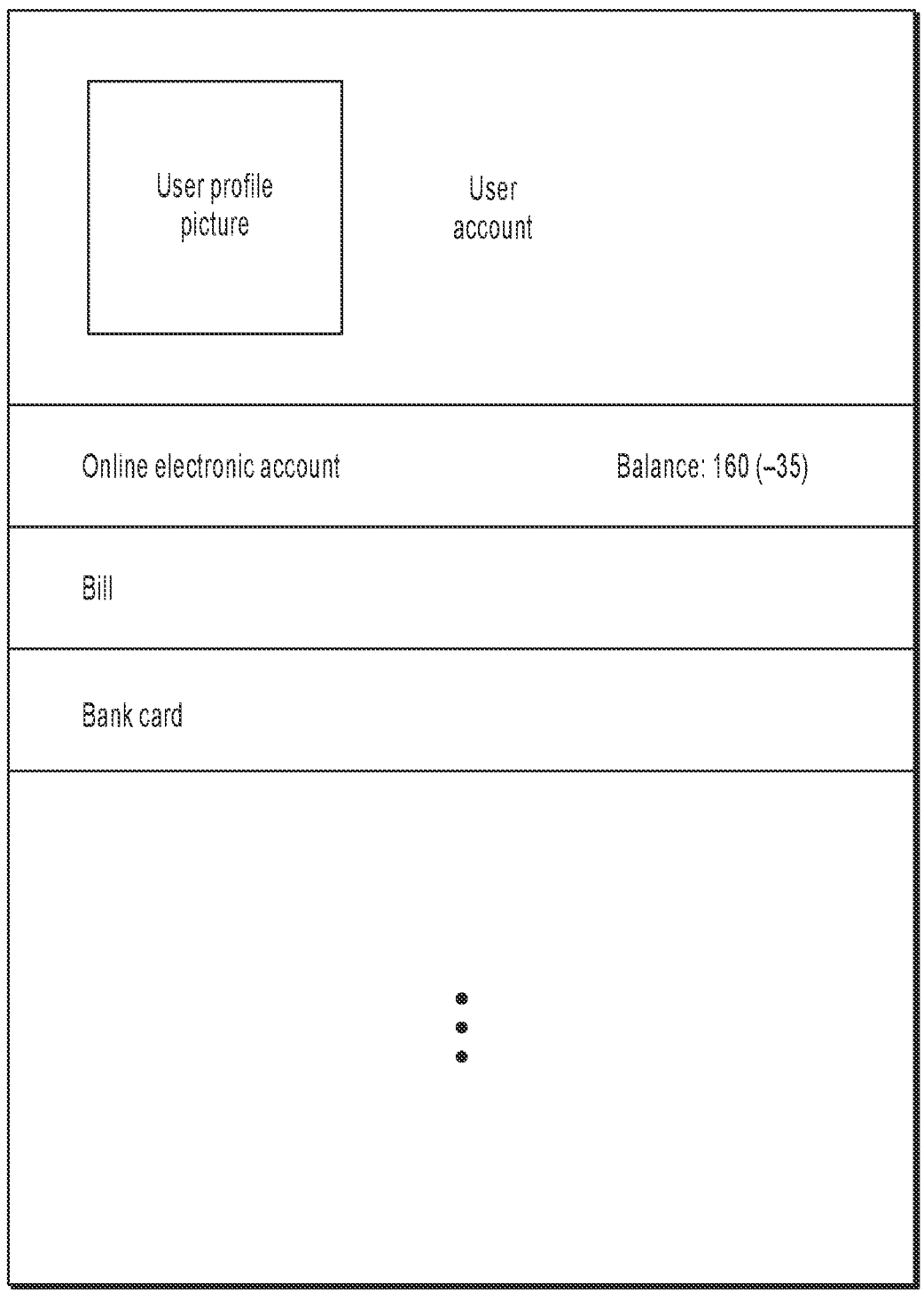

FIG. 5A and FIG. 5B are schematic diagrams illustrating displaying an amount in a first service record to a user by an end-user device, according to the present specification.

For example, after determining, based on the service data sent by the service device, that the amount that needs to be paid by the user this time is 15 RMB, the end-user device can display the amount in the form shown in FIG. 5A. The figure on the left side of the bracket in FIG. 5A is a balance in an online electronic account of the user, and the figure in the bracket is an accumulated payment amount for offline payment made by the user. When the user makes an offline payment again by using the end-user device, the end-user device can determine that a new amount that needs to be paid by the user is 20 RMB. Then, based on FIG. 5A, the figure displayed in the bracket is updated to −35, which indicates that a current accumulated payment amount for offline payment made by the user is 35 RMB.

Certainly, the end-user device can display the amount in the first service record to the user in another way. Details are omitted here for simplicity. Similarly, the service device can display the amount in the second service record to a user in a plurality of ways.

The service processing method provided in one or more implementations of the present specification is described above. Based on the same idea, the present specification further provides a corresponding offline payment apparatus, a corresponding service processing apparatus, and a corresponding payment processing apparatus, as shown in FIG. 6 to FIG. 14.

Figure 6:
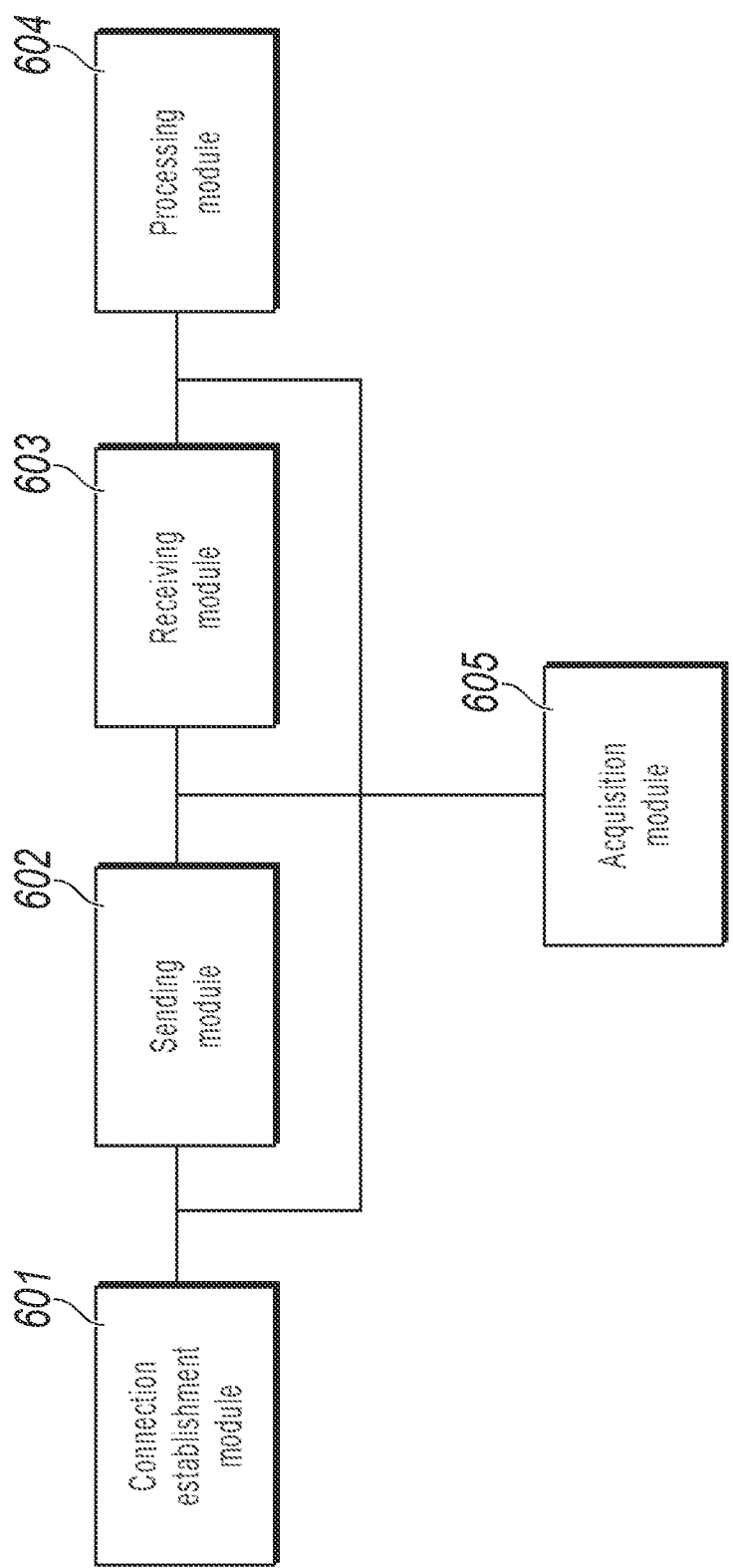
FIG. 6 is a schematic diagram illustrating an offline payment apparatus, according to the present specification.

FIG. 6 is a schematic diagram illustrating an offline payment apparatus, according to the present specification. The apparatus includes: a connection establishment module 601, configured to establish a communication connection between the apparatus and a payment device when both the apparatus and the payment device are in an offline state; a sending module 602, configured to send payment data to the payment device through the communication connection; a receiving module 603, configured to receive a returned payment result obtained by the payment device based on the payment data and account information of the payment device; and a processing module 604, configured to perform collection processing based on the payment result and obtained account information of the payment device, to obtain a collection result.

The communication connection includes at least one of Bluetooth, infrared, ZigBee, and near field communication (NFC).

The apparatus further includes: an acquisition module 605, configured to obtain the account information of the payment device by identifying a digital object identifier (DOI) displayed by the payment device, or configured to obtain the account information of the payment device from the payment device through the communication connection.

The payment result includes information indicating that the payment device successfully deducts an amount from an account of the payment device; and the processing module 604 is configured to add the amount to an account of the apparatus based on the payment result, where the account of the apparatus is an offline electronic account used by the apparatus.

The processing module 604 is configured to generate a collection record based on an amount actually collected by the apparatus, the obtained account information of the payment device, account information of the apparatus, and a collection time at which the apparatus collects the amount, and send the collection record to a server when in an online state, so that the server checks the collection record and a payment record sent by the payment device when in an online state, where the payment record is generated by the payment device by performing payment processing based on the payment data and the account information of the payment device.

Figure 7:
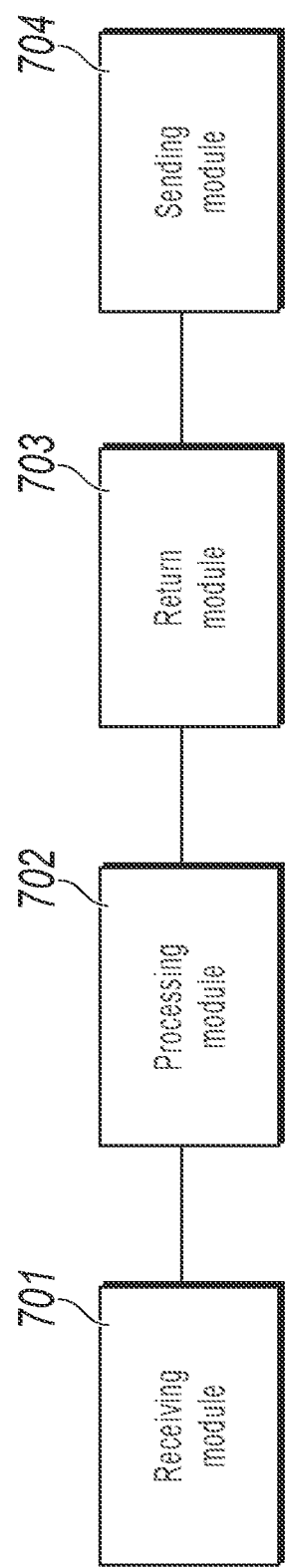
FIG. 7 is a schematic diagram illustrating an offline payment apparatus, according to the present specification.

FIG. 7 is a schematic diagram illustrating an offline payment apparatus, according to the present specification. The apparatus includes: a receiving module 701, configured to: when both a collection device and the apparatus are in an offline state, receive, through a communication connection established to the collection device, payment data sent by the collection device; a processing module 702, configured to perform payment processing based on the payment data and account information of the apparatus, to obtain a payment result; and a return module 703, configured to return the payment result to the collection device, so that the collection device performs collection processing based on the payment result and obtained account information of the apparatus, to obtain a collection result.

The receiving module 701 is configured to obtain a Bluetooth signal that is broadcast by the collection device and that includes the payment data and account information; and receive the payment data when determining that the account information included in the Bluetooth signal matches the account information of the apparatus.

The payment data includes an amount that needs to be paid by the apparatus; and the processing module 702 is configured to determine, based on the payment data, the amount that needs to be paid by the apparatus; and deduct the amount that needs to be paid by the apparatus from an account of the apparatus, where the account of the apparatus is an offline electronic account used by the apparatus.

The processing module 702 is configured to generate a payment record based on a determined amount actually paid by the apparatus, the account information of the apparatus, obtained account information of the collection device, and a payment time at which the apparatus pays the amount, and send the payment record to a server when in an online state, so that the server checks the payment record and a collection record sent by the collection device when in an online state, where the collection record is generated by the collection device by performing collection processing based on the payment data and the account information of the apparatus.

The apparatus further includes: a sending module 704, configured to send a recharge request to the server when the apparatus is in the online state, so that the server transfers a recharge amount in the recharge request from an online electronic account of the apparatus to the offline electronic account of the apparatus.

Figure 8:
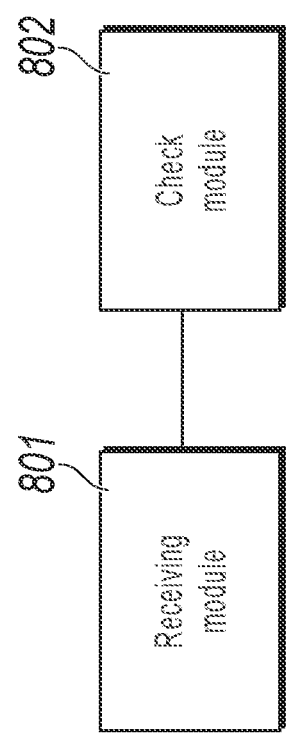
FIG. 8 is a schematic diagram illustrating an offline payment apparatus, according to the present specification.

FIG. 8 is a schematic diagram illustrating an offline payment apparatus, according to the present specification. The apparatus includes: a receiving module 801, configured to receive a payment record sent by a payment device when in an online state and a collection record sent by a collection device when in an online state, where the payment record is generated by executing a payment service with the collection device by the payment device when both the payment device and the collection device are in an offline state, and the collection record is generated by executing a collection service with the payment device by the collection device when both the collection device and the payment device are in the offline state; and a check module 802, configured to perform service check based on the payment record and the collection record.

The check module 802 is configured to determine, based on an amount actually paid by the payment device, account information of the payment device, account information of the collection device, and a payment time at which the payment device pays the amount that are included in the payment record and an amount actually collected by the collection device, account information of the collection device, account information of the payment device, and a collection time at which the collection device collects the amount that are included in the collection record, whether the payment record matches the collection record; when determining that the payment record does not match the collection record, determine a credit limit corresponding to the account information of the collection device and a credit limit corresponding to the account information of the payment device; and adjust at least one of an amount in an account of the collection device and an amount in an account of the payment device based on a payment record or a collection record sent by a device that corresponds to account information corresponding to the highest credit limit.

The check module 802 is configured to determine, by determining whether the payment record and the collection record satisfy the following conditions, whether the payment record matches the collection record: the amount that is actually paid by the payment device and that is included in the payment record is the same as the amount that is actually collected by the collection device and that is included in the collection record; the account information of the payment device that is included in the payment record is the same as the account information of the payment device that is included in the collection record; the account information of the collection device that is included in the payment record is the same as the account information of the collection device that is included in the collection record; and a difference between the payment time included in the payment record and the collection time included in the collection record is not greater than a specified value; and when determining that both the payment record and the collection record satisfy the previous conditions, determine that the payment record matches the collection record; otherwise, determine that the payment record does not match the collection record.

Figure 9:
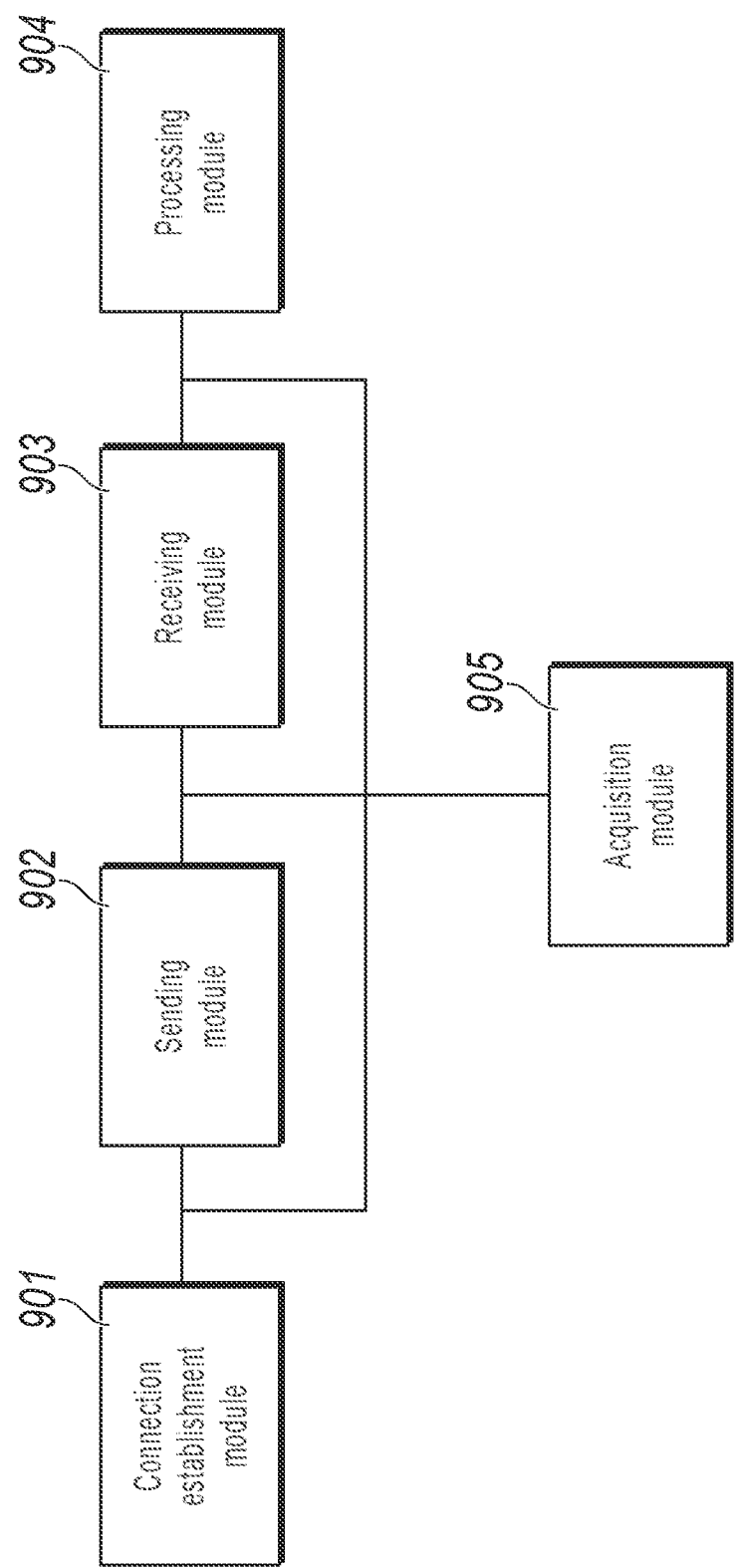
FIG. 9 is a schematic diagram illustrating a service processing apparatus, according to the present specification.

FIG. 9 is a schematic diagram illustrating a service processing apparatus, according to the present specification. The apparatus includes: a connection establishment module 901, configured to establish a communication connection between the apparatus and an end-user device when both the apparatus and the end-user device are in an offline state; a sending module 902, configured to send service data to the end-user device through the communication connection; a receiving module 903, configured to receive a returned first service result obtained by the end-user device based on the service data and account information of the end-user device; and a processing module 904, configured to perform service processing based on the first service result and obtained account information of the end-user device, to obtain a second service result.

The communication connection includes at least one of Bluetooth, infrared, ZigBee, and near field communication (NFC).

The apparatus further includes: an acquisition module 905, configured to obtain the account information of the end-user device, where the acquisition module 905 is configured to obtain the account information of the end-user device by identifying a digital object identifier (DOI) displayed by the end-user device, or is configured to obtain the account information of the end-user device from the end-user device through the communication connection.

The service data includes an amount that needs to be paid by the end-user device; the first service result includes information indicating that the end-user device successfully deducts the amount from an account of the end-user device; and the processing module 904 is configured to add the amount to an account of the apparatus based on the first service result, where the account of the apparatus is an offline electronic account used by the apparatus.

The processing module 904 is configured to generate a second service record based on an amount actually collected by the apparatus, the obtained account information of the end-user device, account information corresponding to the account of the apparatus, and a collection time at which the apparatus collects the amount.

The sending module 902 is configured to send the second service record to a server when the apparatus is in an online state, so that the server checks the second service record and a first service record sent by the end-user device when in an online state, where the first service record is generated by the end-user device by performing service processing based on the service data and the account information of the end-user device.

Figure 10:
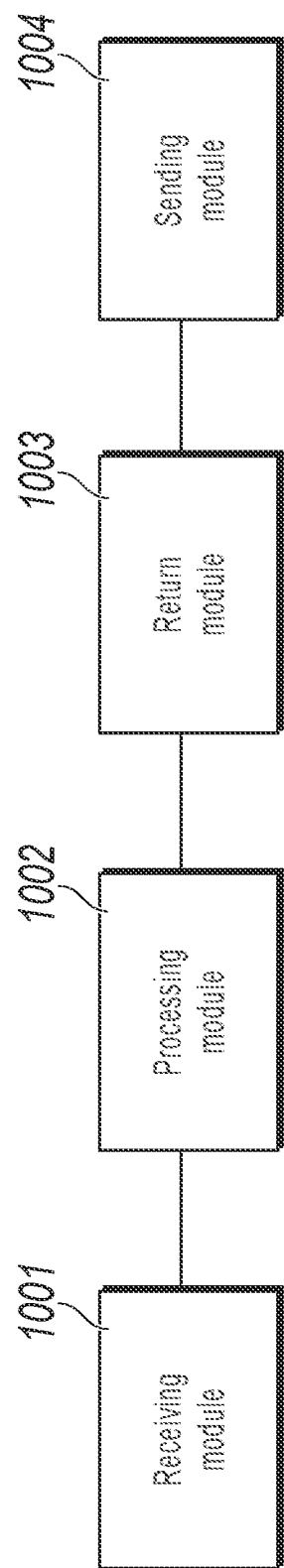
FIG. 10 is a schematic diagram illustrating a service processing apparatus, according to the present specification.

FIG. 10 is a schematic diagram illustrating a service processing apparatus, according to the present specification. The apparatus includes: a receiving module 1001, configured to: when both a service device and the apparatus are in an offline state, receive, through a communication connection established to the service device, service data sent by the service device; a processing module 1002, configured to perform service processing based on the service data and account information of the apparatus, to obtain a first service result; and a return module 1003, configured to return the first service result to the service device, so that the service device performs service processing based on the first service result and obtained account information of the apparatus, to obtain a second service result.

The receiving module 1001 is configured to obtain a Bluetooth signal that is broadcast by the service device and that includes the service data and account information; and receive the service data when determining that the account information included in the Bluetooth signal matches the account information of the apparatus.

The service data includes an amount that needs to be paid by the apparatus; and the processing module 1002 is configured to deduct the amount that needs to be paid by the apparatus from an account of the apparatus, where the account of the apparatus is an offline electronic account used by the apparatus.

The processing module 1002 is configured to generate a first service record based on a determined amount actually paid by the apparatus, the account information of the apparatus, obtained account information of the service device, and a payment time at which the apparatus pays the amount.

The apparatus further includes: a sending module 1004, configured to send the first service record to a server when the apparatus is in an online state, so that the server checks the first service record and a second service record sent by the service device when in an online state, where the second service record is generated by the service device by performing service processing based on the first service result and the account information of the apparatus.

The sending module 1004 is configured to send a recharge request to the server when the apparatus is in the online state, so that the server transfers a recharge amount in the recharge request from an online electronic account of the apparatus to the offline electronic account of the apparatus.

Figure 11:
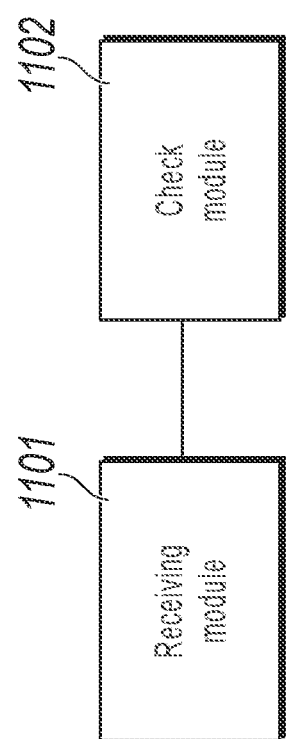
FIG. 11 is a schematic diagram illustrating a service processing apparatus, according to the present specification.

FIG. 11 is a schematic diagram illustrating a service processing apparatus, according to the present specification. The apparatus includes: a receiving module 1101, configured to receive a first service record sent by an end-user device when in an online state and a second service record sent by a service device when in an online state, where the first service record is generated by executing a service with the service device by the end-user device when both the end-user device and the service device are in an offline state, and the second service record is generated by executing the service with the end-user device by the service device when both the service device and the end-user device are in the offline state; and a check module 1102, configured to perform service check based on the first service record and the second service record.

The check module 1102 is configured to determine, based on an amount actually paid by the end-user device, account information of the end-user device, account information of the service device, and a payment time at which the end-user device pays the amount that are included in the first service record and an amount actually collected by the service device, account information of the end-user device, account information of the service device, and a collection time at which the service device collects the amount that are included in the second service record, whether the first service record matches the second service record; when determining that the first service record does not match the second service record, determine a credit limit corresponding to the account information of the service device and a credit limit corresponding to the account information of the end-user device; and adjust at least one of an amount in an account of the service device and an amount in an account of the end-user device based on a service record sent by a device that corresponds to account information corresponding to the highest credit limit.

Figure 12:
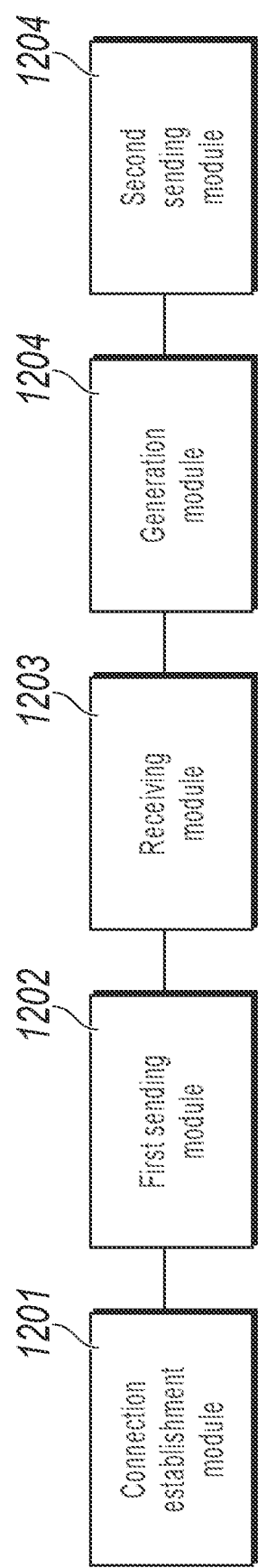
FIG. 12 is a schematic diagram illustrating a payment processing apparatus, according to the present specification.

FIG. 12 is a schematic diagram illustrating a payment processing apparatus, according to the present specification. The apparatus includes: a connection establishment module 1201, configured to establish a communication connection between the apparatus and an end-user device when both the apparatus and the end-user device are in an offline state; a first sending module 1202, configured to send service data to the end-user device through the communication connection; a receiving module 1203, configured to receive a returned first service record generated by the end-user device based on the service data and account information of the end-user device; a generation module 1204, configured to generate a second service record based on the first service record and obtained account information of the end-user device; and a second sending module 1205, configured to send the second service record to a server when in an online state, so that the server performs service processing based on the second service record and the first service record sent by the end-user device when in an online state.

The service data includes an amount that needs to be paid by the end-user device; and the generation module 1204 is configured to generate the second service record based on an amount actually collected by the apparatus, account information of the apparatus, and the obtained account information of the end-user device that are included in the first service record.

Figure 13:
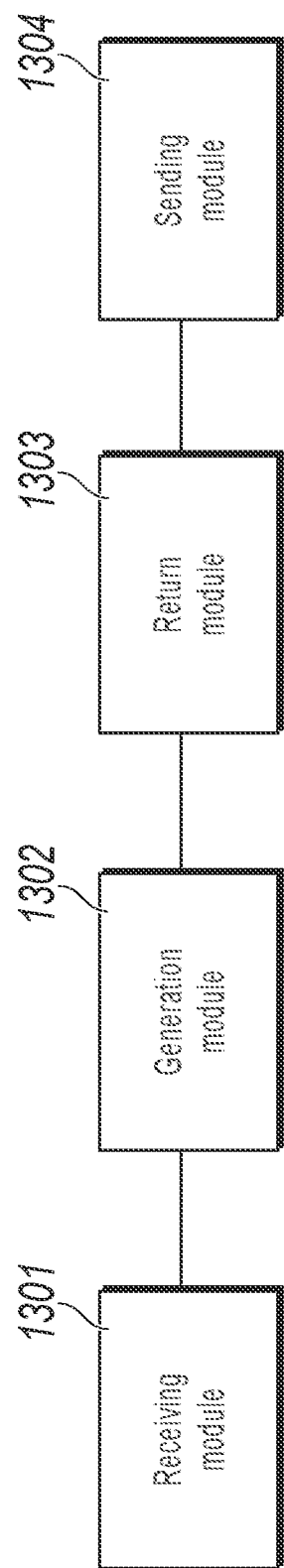
FIG. 13 is a schematic diagram illustrating a payment processing apparatus, according to the present specification.

FIG. 13 is a schematic diagram illustrating a payment processing apparatus, according to the present specification. The apparatus includes: a receiving module 1301, configured to: when both a service device and the apparatus are in an offline state, receive, through a communication connection established to the service device, service data sent by the service device; a generation module 1302, configured to generate a first service record based on the service data and account information of the apparatus; a return module 1303, configured to return the first service record to the service device, so that the service device generates a second service record based on the first service record and obtained account information of the apparatus; and a sending module 1304, configured to send the first service record to a server when in an online state, so that the server performs service processing based on the first service record and the second service record sent by the service device when in an online state.

The service data includes an amount that needs to be paid by the apparatus; and the generation module 1302 is configured to generate the first service record based on an amount actually paid by the apparatus, the account information of the apparatus, and obtained account information of the service device.

Figure 14:
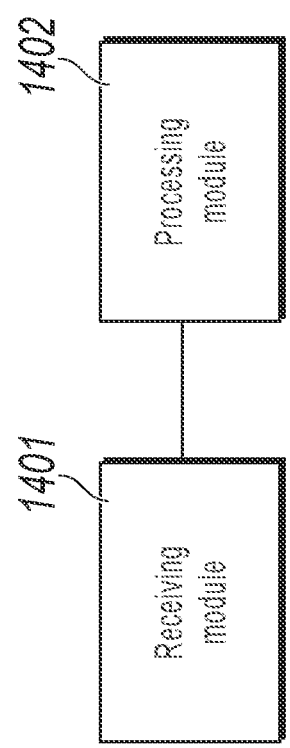
FIG. 14 is a schematic diagram illustrating a payment processing apparatus, according to the present specification.

FIG. 14 is a schematic diagram illustrating a service processing apparatus, according to the present specification. The apparatus includes: a receiving module 1401, configured to receive a first service record sent by an end-user device when in an online state and a second service record sent by a service device when in an online state, where the first service record is generated by executing a service with the service device by the end-user device when both the end-user device and the service device are in an offline state, and the second service record is generated by executing the service with the end-user device by the service device when both the service device and the end-user device are in the offline state; and a processing module 1402, configured to perform service processing based on the first service record and the second service record.

The processing module 1402 is configured to: when determining, based on amounts and account information of the two transaction parties that are included in the first service record and the second service record, that the first service record matches the second service record, transfer the amount from an account of the end-user device to an account of the service device.

Figure 15:
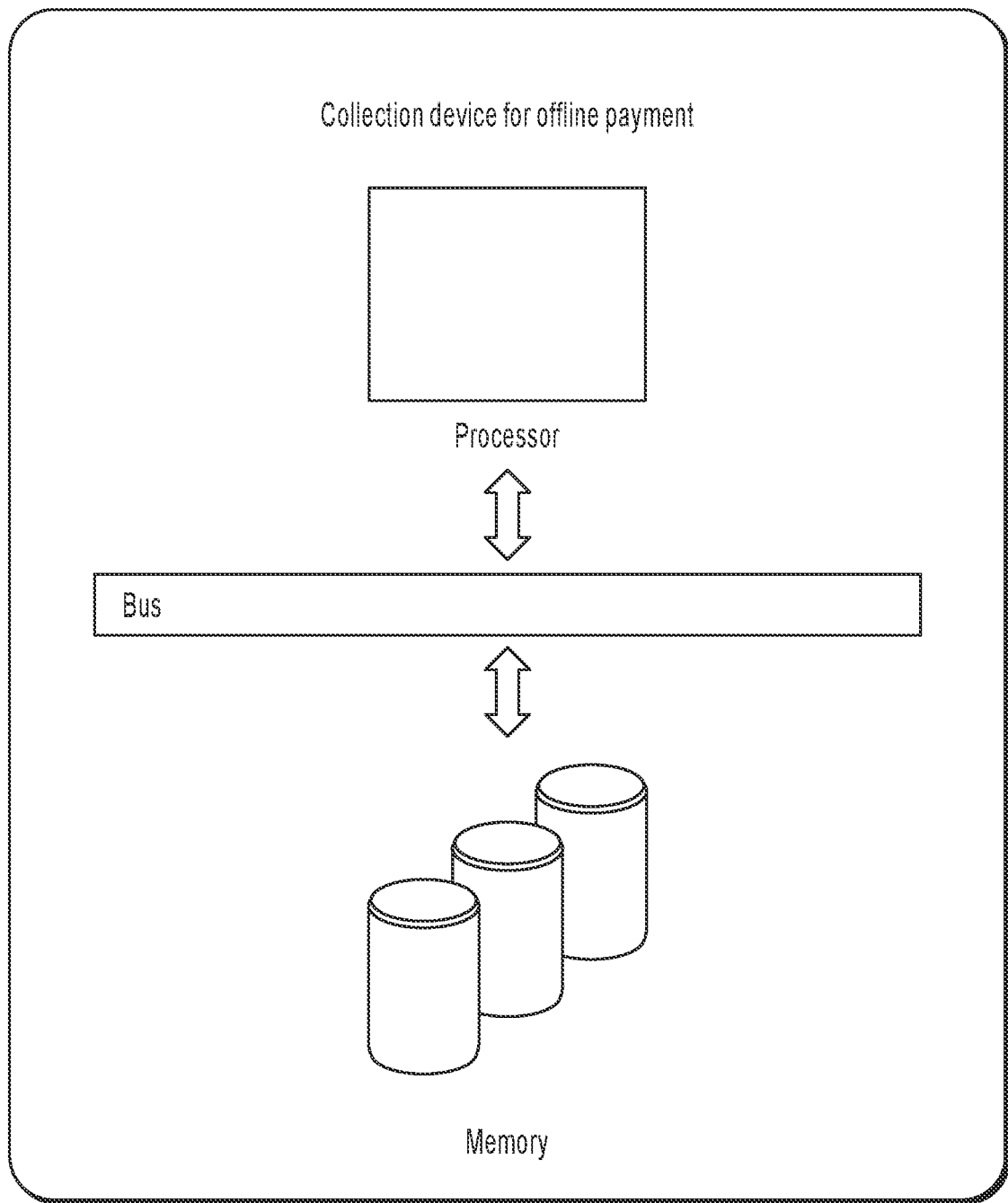
FIG. 15 is a schematic diagram illustrating a collection device for offline payment, according to the present specification.

Based on the offline payment method described in FIG. 1, the present specification further correspondingly provides a collection device for offline payment, as shown in FIG. 15. The collection device for offline payment includes one or more processors and memories. The memory stores a program, and the program is executed by the one or more processors to perform the following steps: establishing a communication connection between the collection device and a payment device when both the collection device and the payment device are in an offline state; sending payment data to the payment device through the communication connection; receiving a returned payment result obtained by the payment device based on the payment data and account information of the payment device; and performing collection processing based on the payment result and obtained account information of the payment device, to obtain a collection result.

Figure 16:
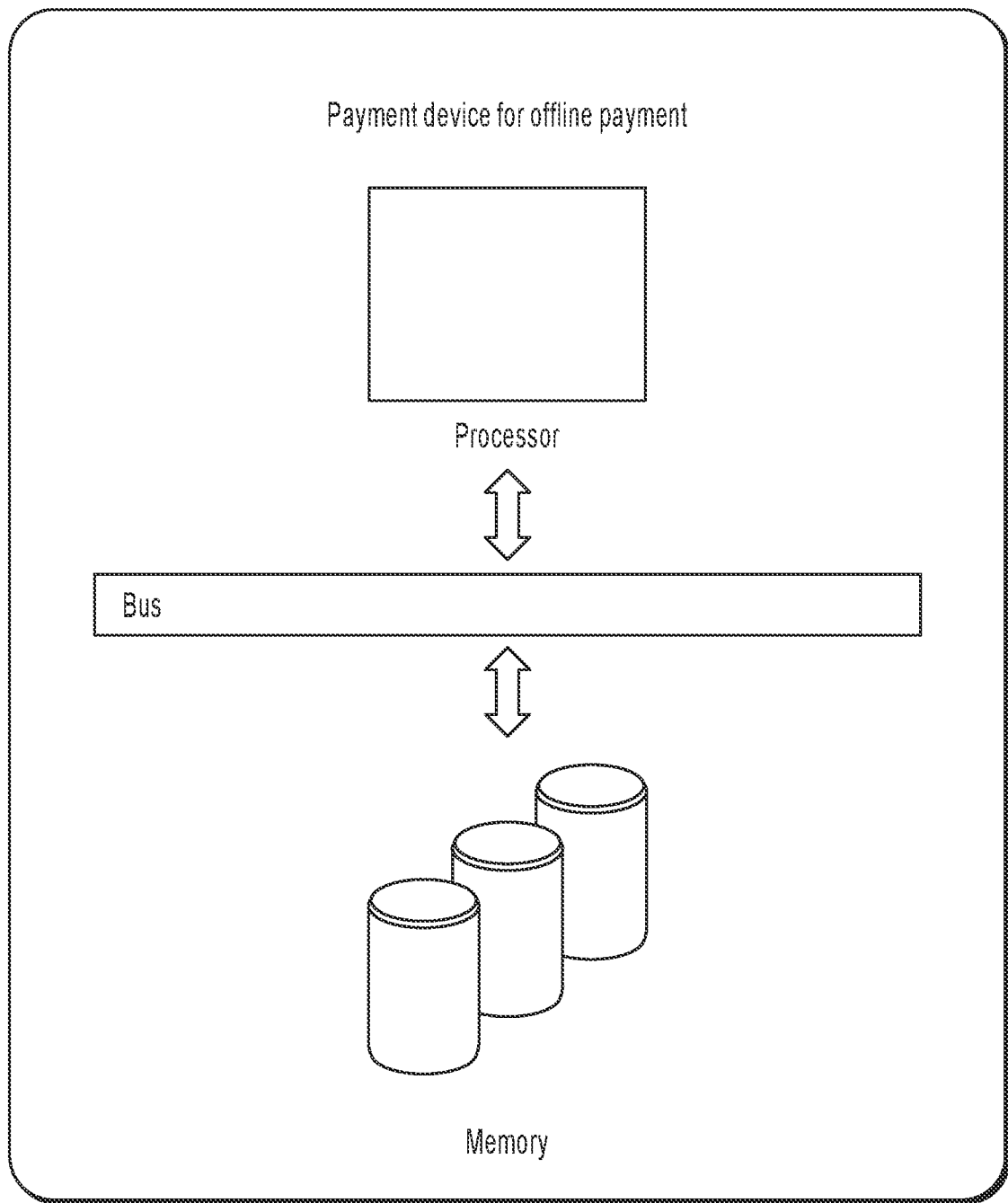
FIG. 16 is a schematic diagram illustrating a payment device for offline payment, according to the present specification.

Based on the offline payment method described in FIG. 1, the present specification further correspondingly provides a payment device for offline payment, as shown in FIG. 16. The payment device for offline payment includes one or more processors and memories. The memory stores a program, and the program is executed by the one or more processors to perform the following steps: when both a collection device and the payment device are in an offline state, receiving, by the payment device through a communication connection established to the collection device, payment data sent by the collection device; performing payment processing based on the payment data and account information of the payment device, to obtain a payment result; and returning the payment result to the collection device, so that the collection device performs collection processing based on the payment result and obtained account information of the payment device, to obtain a collection result.

Figure 17:
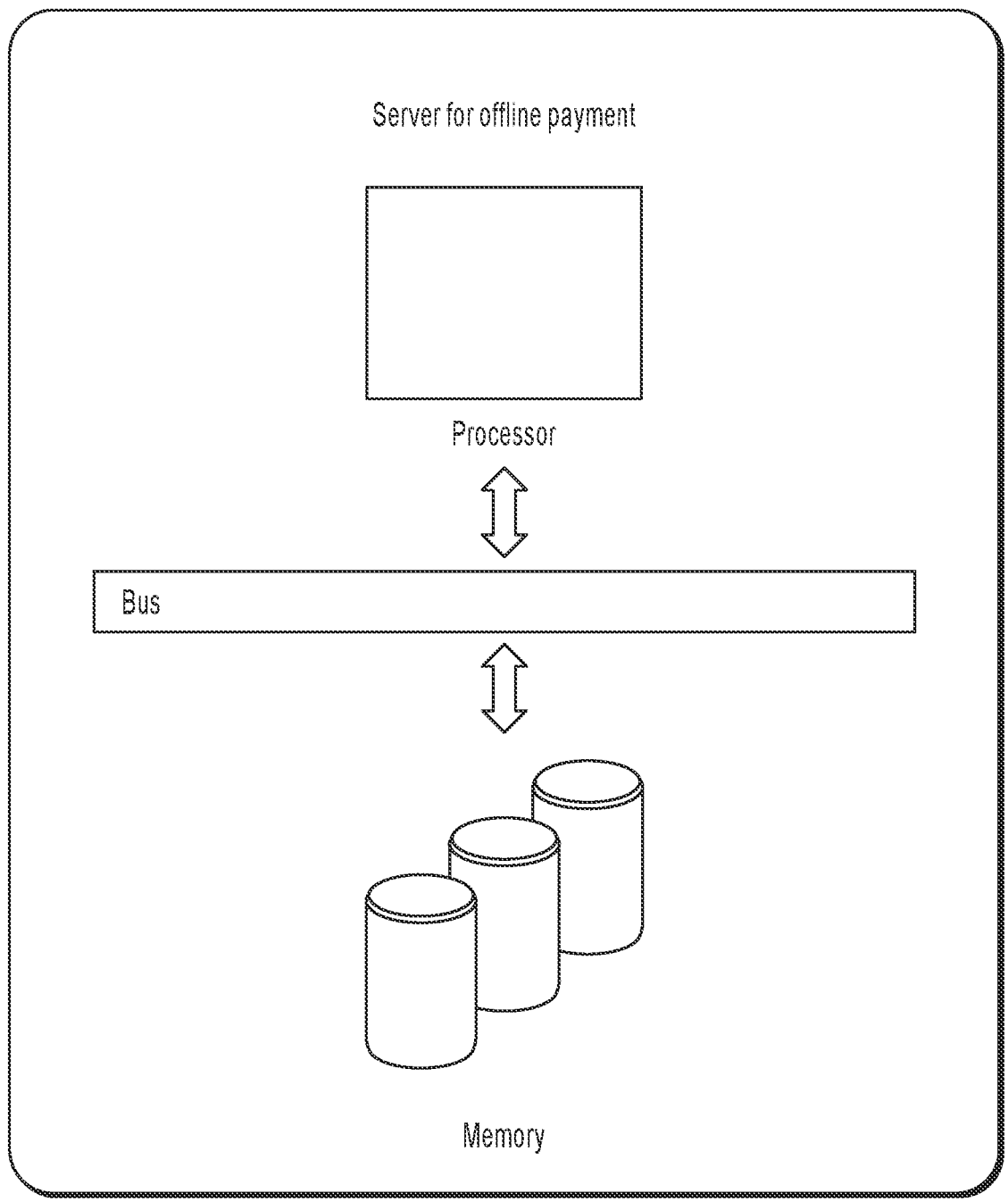
FIG. 17 is a schematic diagram illustrating a server for offline payment, according to the present specification.

Based on the offline payment method described in FIG. 1, the present specification further correspondingly provides a server for offline payment, as shown in FIG. 17. The server for offline payment includes one or more processors and memories. The memory stores a program, and the program is executed by the one or more processors to perform the following steps: receiving a payment record sent by a payment device when in an online state and a collection record sent by a collection device when in an online state, where the payment record is generated by executing a payment service with the collection device by the payment device when both the payment device and the collection device are in an offline state, and the collection record is generated by executing a collection service with the payment device by the collection device when both the collection device and the payment device are in the offline state; and performing service check based on the payment record and the collection record.

Figure 18:
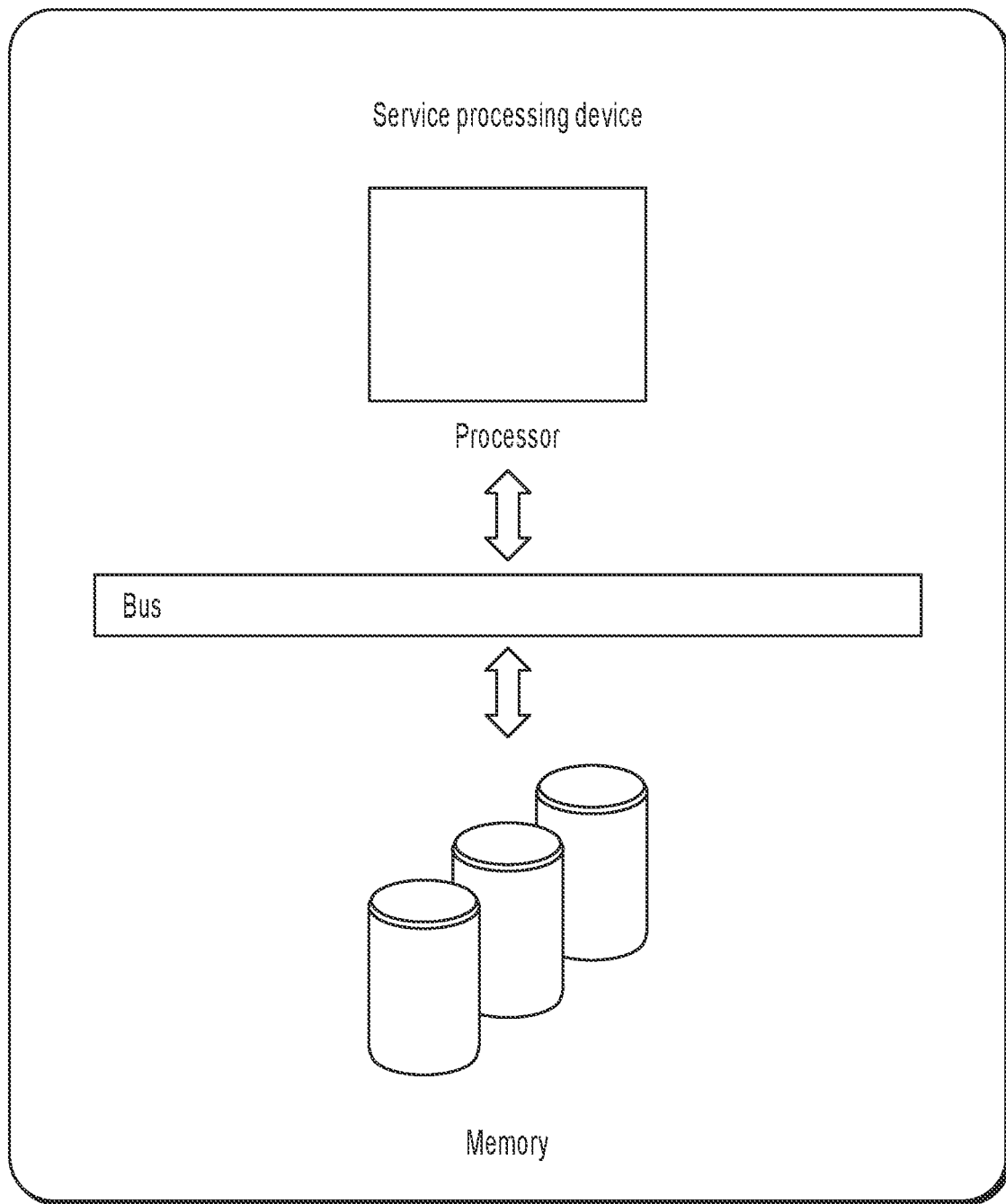
FIG. 18 is a schematic diagram illustrating a service processing device, according to the present specification.

Based on the service processing method described in FIG. 3, the present specification further correspondingly provides a service processing device, as shown in FIG. 18. The service processing device includes one or more processors and memories. The memory stores a program, and the program is executed by the one or more processors to perform the following steps: establishing a communication connection between the device and an end-user device when both the device and the end-user device are in an offline state; sending service data to the end-user device through the communication connection; receiving a returned first service result obtained by the end-user device based on the service data and account information of the end-user device; and performing service processing based on the first service result and obtained account information of the end-user device, to obtain a second service result.

Figure 19:
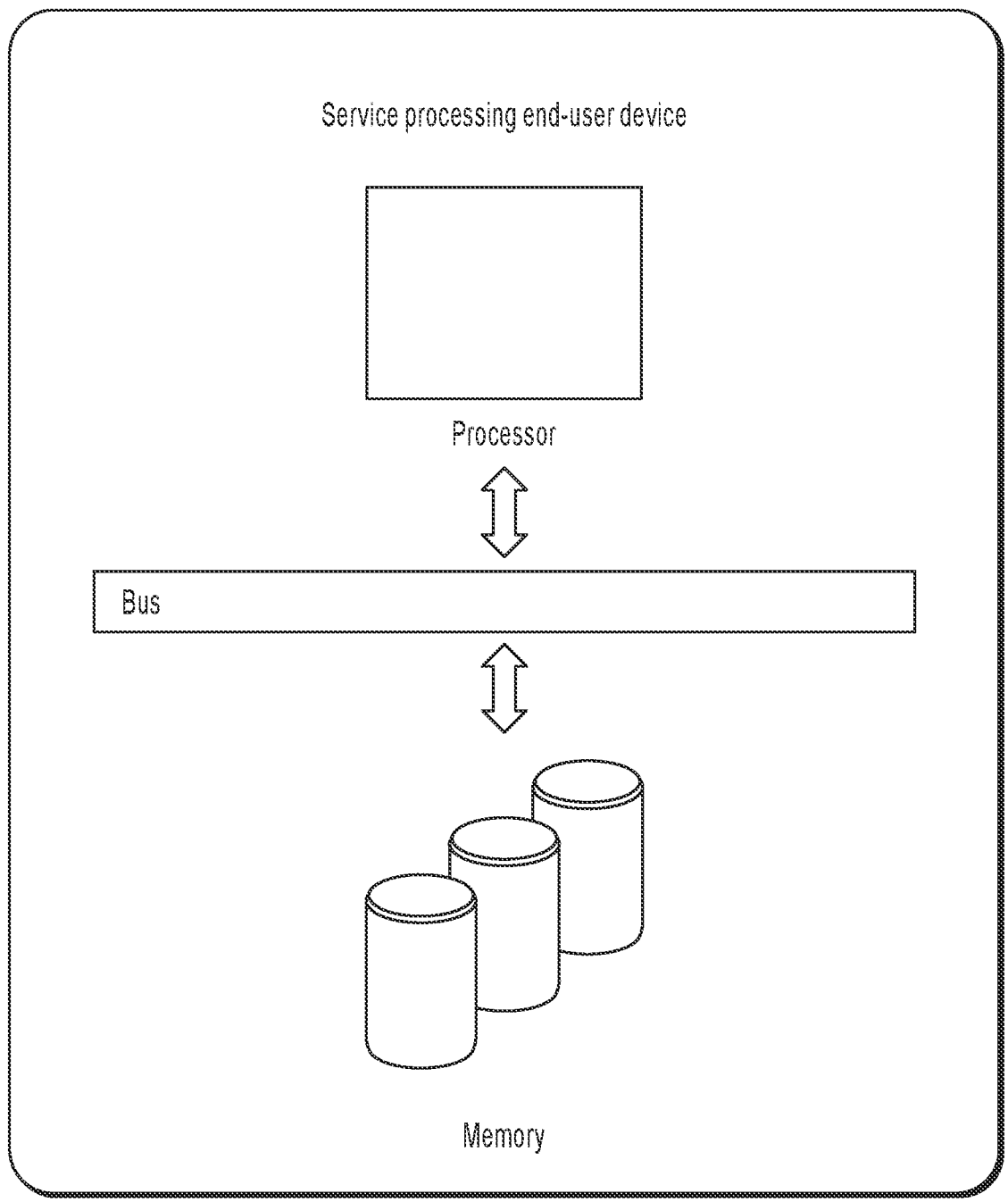
FIG. 19 is a schematic diagram illustrating a service processing end-user device, according to the present specification.

Based on the service processing method described in FIG. 3, the present specification further correspondingly provides a service processing end-user device, as shown in FIG. 19. The service processing end-user device includes one or more processors and memories. The memory stores a program, and the program is executed by the one or more processors to perform the following steps: when both a service device and the end-user device are in an offline state, receiving, by the end-user device through a communication connection established to the service device, service data sent by the service device; performing service processing based on the service data and account information of the end-user device, to obtain a first service result; and returning the first service result to the service device, so that the service device performs service processing based on the first service result and obtained account information of the end-user device, to obtain a second service result.

Figure 20:
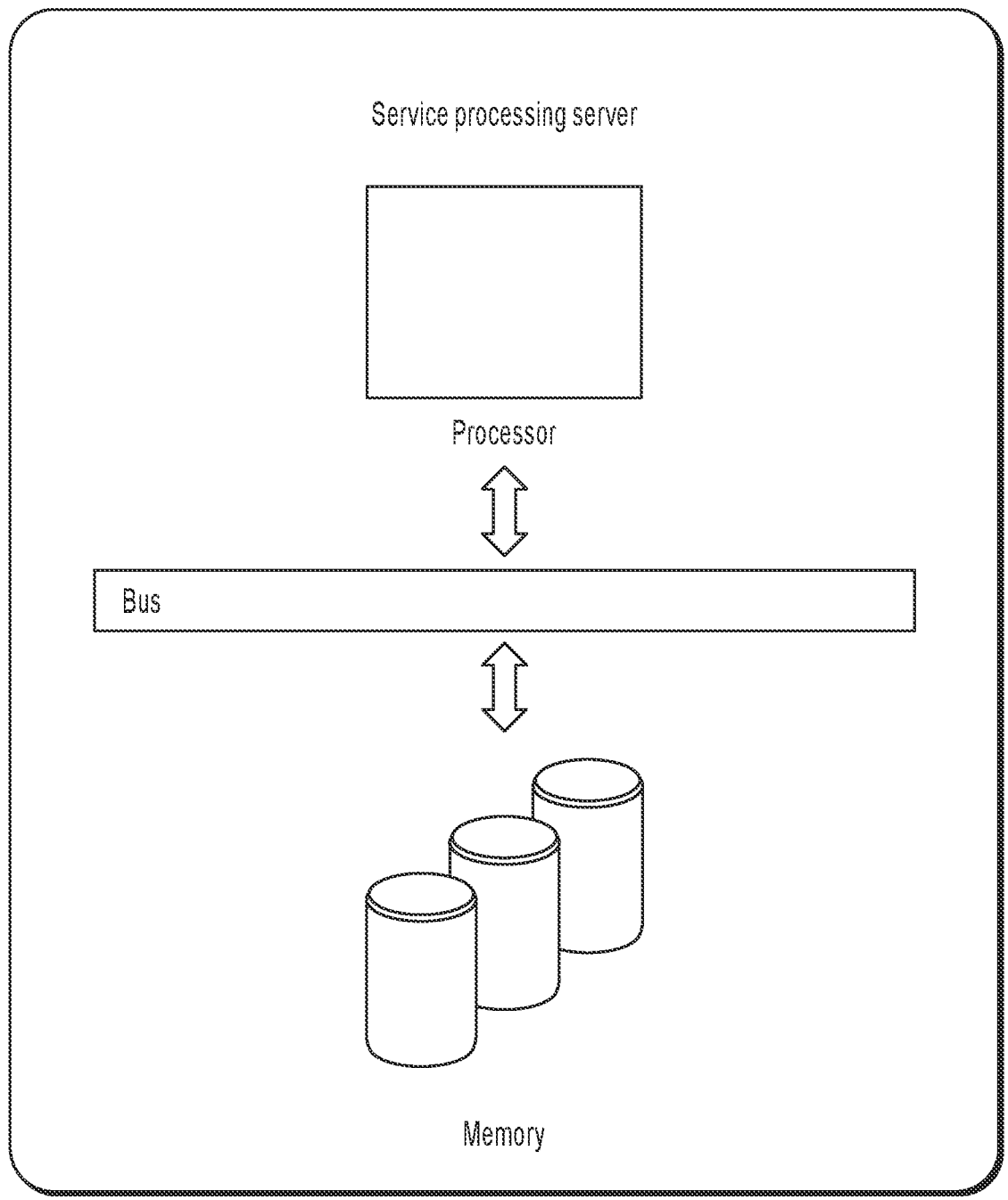
FIG. 20 is a schematic diagram illustrating a service processing server, according to the present specification.

Based on the service processing method described in FIG. 3, the present specification further correspondingly provides a service processing server, as shown in FIG. 20. The service processing server includes one or more processors and memories. The memory stores a program, and the program is executed by the one or more processors to perform the following steps: receiving a first service record sent by an end-user device when in an online state and a second service record sent by a service device when in an online state, where the first service record is generated by executing a service with the service device by the end-user device when both the end-user device and the service device are in an offline state, and the second service record is generated by executing the service with the end-user device by the service device when both the service device and the end-user device are in the offline state; and performing service check based on the first service record and the second service record.

Figure 21:
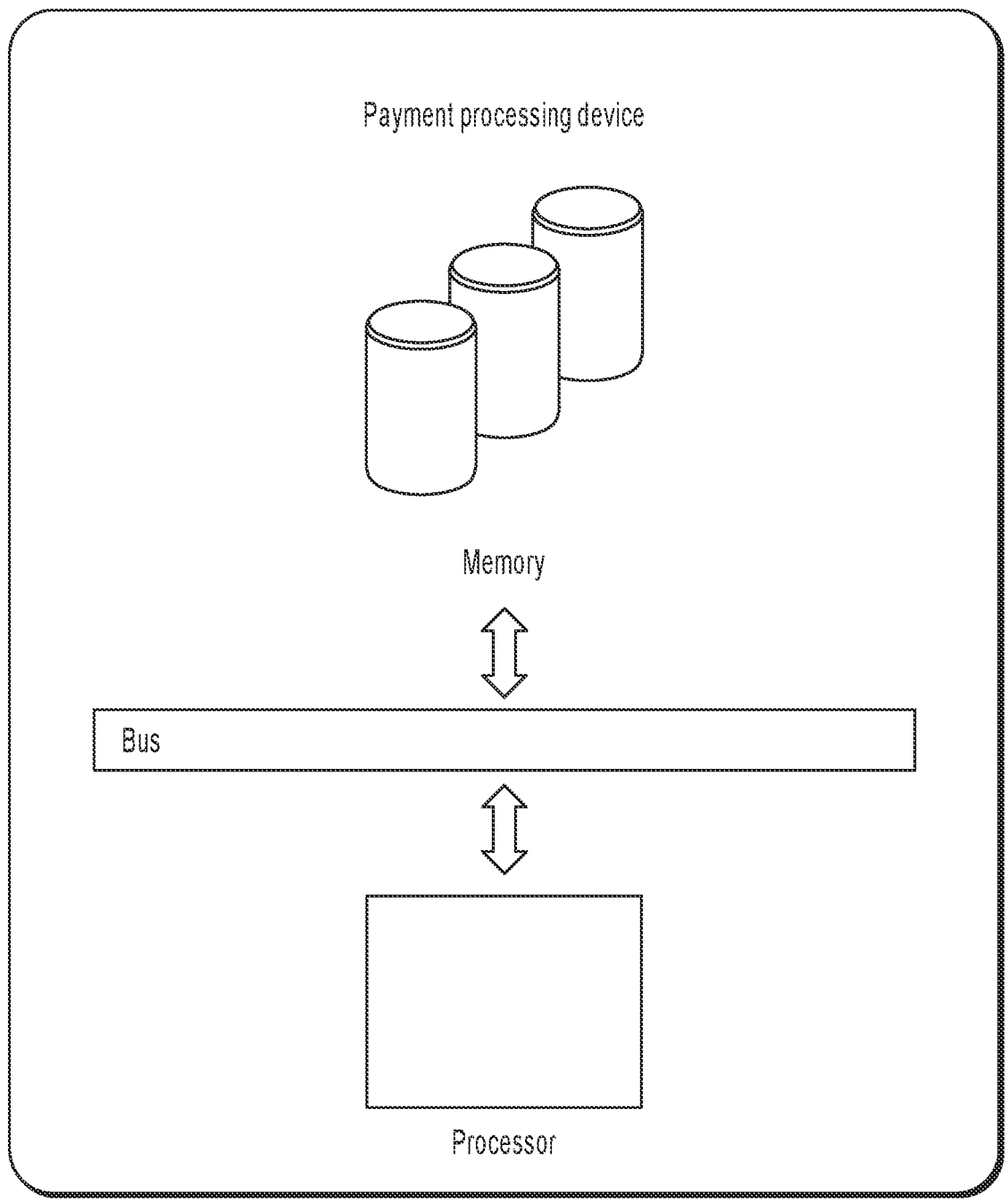
FIG. 21 is a schematic diagram illustrating a payment processing device, according to the present specification.

Based on the payment processing method described in FIG. 4, the present specification further correspondingly provides a payment processing device, as shown in FIG. 21. The payment processing device includes one or more processors and memories. The memory stores a program, and the program is executed by the one or more processors to perform the following steps: establishing a communication connection between the device and an end-user device when both the device and the end-user device are in an offline state; sending service data to the end-user device through the communication connection; receiving a returned first service record generated by the end-user device based on the service data and account information of the end-user device; generating a second service record based on the first service record and obtained account information of the end-user device; and sending the second service record to a server when in an online state, so that the server performs service processing based on the second service record and the first service record sent by the end-user device when in an online state.

Figure 22:
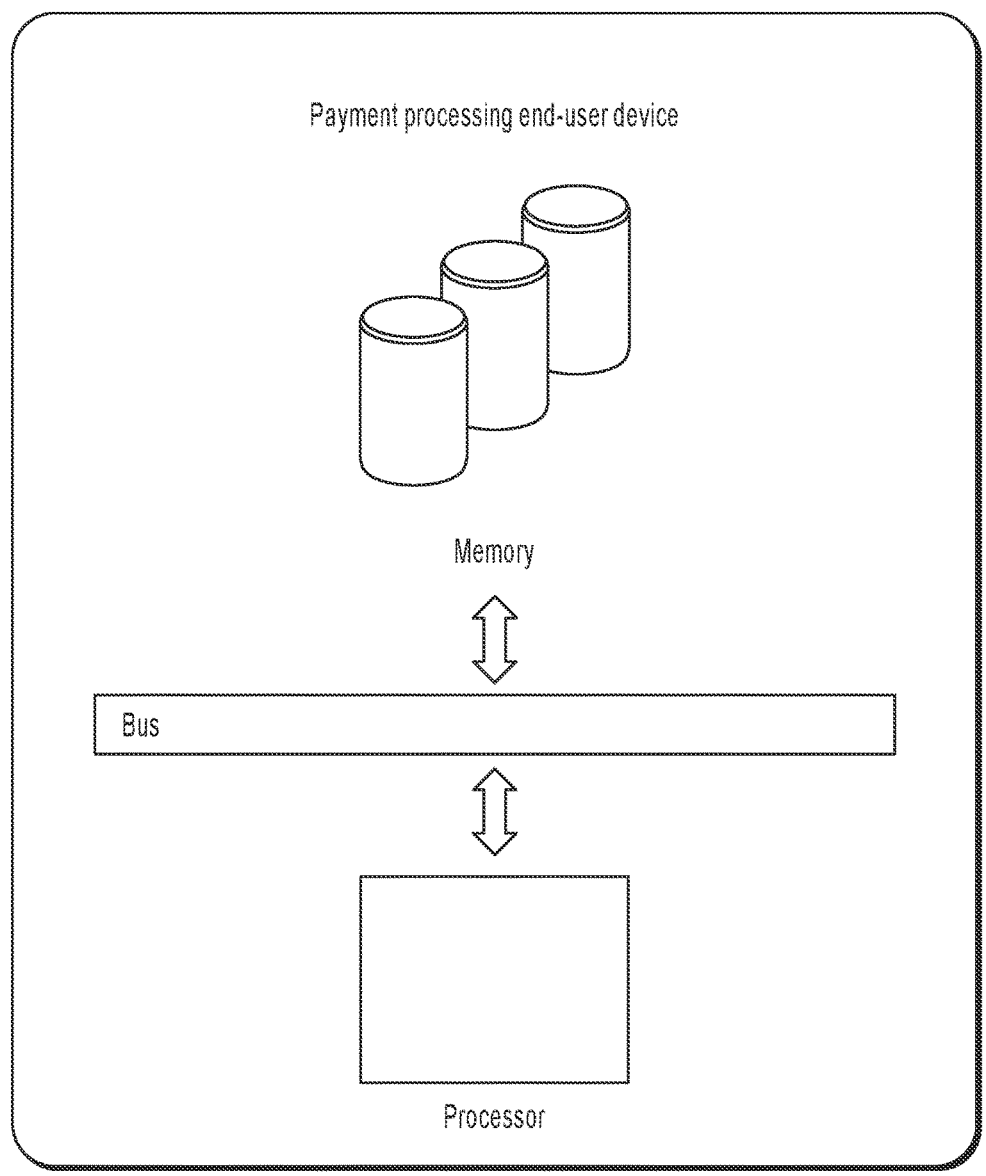
FIG. 22 is a schematic diagram illustrating a payment processing end-user device, according to the present specification.

Based on the payment processing method described in FIG. 4, the present specification further correspondingly provides a payment processing end-user device, as shown in FIG. 22. The payment processing end-user device includes one or more processors and memories. The memory stores a program, and the program is executed by the one or more processors to perform the following steps: when both a service device and the end-user device are in an offline state, receiving, by the end-user device through a communication connection established to the service device, service data sent by the service device; generating a first service record based on the service data and account information of the end-user device; returning the first service record to the service device, so that the service device generates a second service record based on the first service record and obtained account information of the end-user device; and sending the first service record to a server when in an online state, so that the server performs service processing based on the first service record and the second service record sent by the service device when in an online state.

Figure 23:
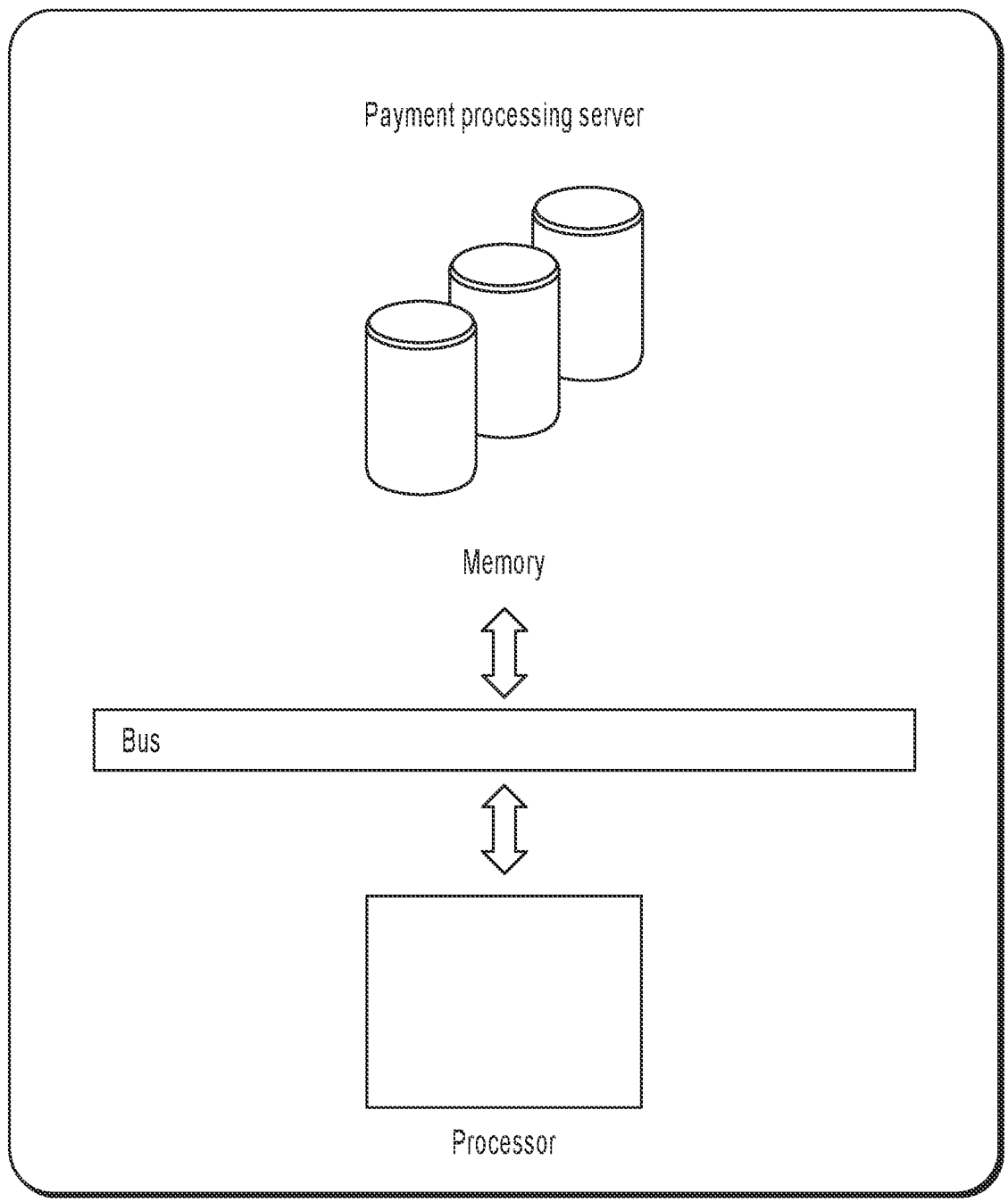
FIG. 23 is a schematic diagram illustrating a payment processing server, according to the present specification.

Based on the payment processing method described in FIG. 4, the present specification further correspondingly provides a payment processing server, as shown in FIG. 23. The payment processing server includes one or more processors and memories. The memory stores a program, and the program is executed by the one or more processors to perform the following steps: receiving a first service record sent by an end-user device when in an online state and a second service record sent by a service device when in an online state, where the first service record is generated by executing a service with the service device by the end-user device when both the end-user device and the service device are in an offline state, and the second service record is generated by executing the service with the end-user device by the service device when both the service device and the end-user device are in the offline state; and performing service processing based on the first service record and the second service record.

In the one or more implementations of the present specification, when both the collection device and the payment device are in the offline state, the collection device can send the payment data to the payment device through the communication connection established to the payment device, so that the payment device can perform payment processing based on the payment data, to obtain the payment result, and return the payment result to the collection device, and the collection device can perform collection processing based on the payment result and the obtained account information of the payment device, to obtain the collection result. When in the offline state, the payment device and the collection device can send data to each other through the communication connection established between the payment device and the collection device, and make an offline payment. As such, even if a payment device held by a user is in an offline state, the user can still make an offline payment by using the payment device, bringing convenience the user.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors:

ARC 625D, Atmel AT91SAM, Microchip PIC18F26K20, and Silicone Labs C8051F320. The memory controller can also be implemented as a part of control logic of a memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous apparatus is described by dividing functions into various units. Certainly, when the solutions provided in the present specification are implemented, functions of each unit can be implemented in one or more pieces of software and/or hardware.

A person skilled in the art should understand that an implementation of the present specification can be provided as a method, a system, or a computer program product. Therefore, the present specification can use a form of hardware only implementations, software only implementations, or implementations with a combination of software and hardware. Moreover, the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on one or more implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the other programmable data processing device generate a device for implementing a specific function in one or more processes in the flowcharts and/or in one or more blocks in the block diagrams.

These computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, a computing device includes one or more processors (CPU), input/output interfaces, network interfaces, and memories.

The memory can include a non-persistent memory, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a magnetic cassette, a magnetic tape, a magnetic disk storage or another magnetic storage device, or any other non-transmission medium that can be used to store information accessible to the computing device. Based on the definition in the present specification, the computer readable medium does not include transitory computer readable media (transitory media) such as a modulated data signal and carrier.

It is worthwhile to further note that the terms "include", "comprise", or their any other variants are intended to cover a nonexclusive inclusion, so that a process, a method, a product, or a device that includes a list of elements not only includes those elements but also includes other elements which are not expressly listed, or further includes elements inherent to such process, method, product, or device. An element preceded by "includes a . . . " does not, without more constraints, preclude the existence of additional identical elements in the process, method, product, or device that includes the element.

The present specification can be described in the general context of computer executable instructions executed by a computer, for example, a program module. The program module usually includes a routine, a program, an object, a component, a data structure, etc. for executing a specific task or implementing a specific abstract data type. The one or more implementations of the present specification can alternatively be practiced in distributed computing environments. In the distributed computing environments, tasks are executed by remote processing devices that are connected through a communications network. In the distributed computing environment, the program module can be located in both local and remote computer storage media including storage devices.

The implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related descriptions in the method implementation.

Specific implementations of the present specification are described above. Other implementations fall within the scope of the appended claims. In some situations, the actions or steps described in the claims can be performed in a sequence different from the sequence in the implementation and the desired results can still be achieved. In addition, the process depicted in the accompanying drawings does not necessarily require a particular execution sequence to achieve the desired results. In some implementations, multi-tasking and parallel processing can be advantageous.

The previous descriptions are merely one or more implementations of the present specification, and are not intended to limit the present specification. For a person skilled in the art, various modifications and changes can be made to the one or more implementations of the present specification. Any modification, equivalent replacement, improvement, etc. made within the spirit and the principle of the one or more implementations of the present specification shall fall within the scope of the claims in the present specification.

What is claimed is:

1. A computer-implemented method for an offline service processing, comprising:
    establishing a communication connection between a service device and an end-user device, wherein both the service device and the end-user device are in an offline state;
    receiving, by the end-user device through the communication connection established to the service device, service data sent by the service device;
    generating, by the end-user device, a first service record based on the service data and account information of the end-user device;
    sending, by the end-user device and through the communication connection, the first service record to the service device;
    generating, by the service device, a second service record based on the first service record and the account information of the end-user device;
    sending, by the end-user device, the first service record to a server when the end-user device is in an online state;
    sending, by the service device, the second service record to the server when the service device is in an online state;
    performing, by the server, service processing based on the first service record and the second service record; and
    determining, by the server, based at least on a first amount, the account information of the end-user device, account information of the service device comprised in the first service record, a second amount, the account information of the end-user device, the account information of the service device comprised in the second service record, whether the first service record matches the second service record.

2. The computer-implemented method of claim 1, further comprising:
    determining that the first service record matches the second service record;
    in response to determining that the first service record matches the second service record:
        deducting, by the server, the first amount from an account of the end-user device; and
        adding, the second amount to an account of the service device.

3. The computer-implemented method of claim 1, further comprising:
    determining that the first service record does not match the second service record;
    in response to determining that the first service record does not match the second service record:
        determining, by the server, a first credit limit corresponding to the account information of the end-user device and a second credit limit corresponding to the account information of the service device; and
        adjusting, by the server, at least one of an amount in an account of the end-user device and an amount in an account of the service device that corresponds to account information corresponding to a higher credit limit of the first and second credit limit.

4. The computer-implemented method of claim 1, further comprising:
    determining that the first service record does not match the second service record;
    in response to determining that the first service record does not match the second service record:
        determining, by the server, a first reliability score of the end-user device and a second reliability score of the service device; and
        performing, by the server, the service processing based on a specific service record among the first service record and the second service record corresponding to a higher reliability score of the first reliability score and the second reliability score.

5. The computer-implemented method of claim 4, wherein the first reliability score comprises first risk control information corresponding to the account information of the end-user device, the second reliability score comprises second risk control information corresponding to the account information of the service device.

6. The computer-implemented method of claim 1, wherein determining whether the first service record matches the second service record comprises:
    determining whether the first service record and the second service record satisfy one or more conditions, wherein the one or more conditions comprise:
        the account information of the end-user device that is comprised in the first service record matches the account information of the end-user device that is comprised in the second service record;
        the account information of the service device that is comprised in the first service record matches the account information of the service device that is comprised in the second service record; and
        the first amount that is comprised in the first service record matches the second amount that is comprised in the second service record.

7. The computer-implemented method of claim 1, wherein the communication connection comprises at least one of Bluetooth, infrared, ZigBee, or near field communication (NFC).

8. A non-transitory, computer-readable medium storing one or more instructions executable by a computer system to perform operations comprising:

establishing a communication connection between a service device and an end-user device, wherein both the service device and the end-user device are in an offline state;
receiving, by the end-user device through the communication connection established to the service device, service data sent by the service device;
generating, by the end-user device, a first service record based on the service data and account information of the end-user device;
sending, by the end-user device and through the communication connection, the first service record to the service device;
generating, by the service device, a second service record based on the first service record and the account information of the end-user device;
sending, by the end-user device, the first service record to a server when the end-user device is in an online state;
sending, by the service device, the second service record to the server when the service device is in an online state;
performing, by the server, service processing based on the first service record and the second service record; and
determining, by the server, based at least on a first amount, the account information of the end-user device, account information of the service device comprised in the first service record, a second amount, the account information of the end-user device, the account information of the service device comprised in the second service record, whether the first service record matches the second service record.

9. The non-transitory, computer-readable medium of claim 8, wherein the operations further comprise:
determining that the first service record matches the second service record;
in response to determining that the first service record matches the second service record:
deducting, by the server, the first amount from an account of the end-user device; and
adding, the second amount to an account of the service device.

10. The non-transitory, computer-readable medium of claim 8, wherein the operations further comprise:
determining that the first service record does not match the second service record;
in response to determining that the first service record does not match the second service record:
determining, by the server, a first credit limit corresponding to the account information of the end-user device and a second credit limit corresponding to the account information of the service device; and
adjusting, by the server, at least one of an amount in an account of the end-user device and an amount in an account of the service device that corresponds to account information corresponding to a higher credit limit of the first and second credit limit.

11. The non-transitory, computer-readable medium of claim 8, wherein the operations further comprise:
determining that the first service record does not match the second service record;
in response to determining that the first service record does not match the second service record:
determining, by the server, a first reliability score of the end-user device and a second reliability score of the service device; and
performing, by the server, the service processing based on a specific service record among the first service record and the second service record corresponding to a higher reliability score of the first reliability score and the second reliability score.

12. The non-transitory, computer-readable medium of claim 11, wherein the first reliability score comprises first risk control information corresponding to the account information of the end-user device, the second reliability score comprises second risk control information corresponding to the account information of the service device.

13. The non-transitory, computer-readable medium of claim 8, wherein determining whether the first service record matches the second service record comprises:
determining whether the first service record and the second service record satisfy one or more conditions, wherein the one or more conditions comprise:
the account information of the end-user device that is comprised in the first service record matches the account information of the end-user device that is comprised in the second service record;
the account information of the service device that is comprised in the first service record matches the account information of the service device that is comprised in the second service record; and
the first amount that is comprised in the first service record matches the second amount that is comprised in the second service record.

14. The non-transitory, computer-readable medium of claim 8, wherein the communication connection comprises at least one of Bluetooth, infrared, ZigBee, or near field communication (NFC).

15. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
establishing a communication connection between a service device and an end-user device, wherein both the service device and the end-user device are in an offline state;
receiving, by the end-user device through the communication connection established to the service device, service data sent by the service device;
generating, by the end-user device, a first service record based on the service data and account information of the end-user device;
sending, by the end-user device and through the communication connection, the first service record to the service device;
generating, by the service device, a second service record based on the first service record and the account information of the end-user device;
sending, by the end-user device, the first service record to a server when the end-user device is in an online state;
sending, by the service device, the second service record to the server when the service device is in an online state;
performing, by the server, service processing based on the first service record and the second service record; and
determining, by the server, based at least on a first amount, the account information of the end-user device, account information of the service device comprised in the first service record, a second amount, the account information of the end-user device, the account information of the service device comprised in the second service record, whether the first service record matches the second service record.

16. The computer-implemented system of claim 15, wherein the operations further comprise:
   determining that the first service record matches the second service record;
   in response to determining that the first service record matches the second service record:
      deducting, by the server, the first amount from an account of the end-user device; and
      adding, the second amount to an account of the service device.

17. The computer-implemented system of claim 15, wherein the operations further comprise:
   determining that the first service record does not match the second service record;
   in response to determining that the first service record does not match the second service record:
      determining, by the server, a first credit limit corresponding to the account information of the end-user device and a second credit limit corresponding to the account information of the service device; and
      adjusting, by the server, at least one of an amount in an account of the end-user device and an amount in an account of the service device that corresponds to account information corresponding to a higher credit limit of the first and second credit limit.

18. The computer-implemented system of claim 15, wherein the operations further comprise:
   determining that the first service record does not match the second service record;
   in response to determining that the first service record does not match the second service record:
      determining, by the server, a first reliability score of the end-user device and a second reliability score of the service device; and
      performing, by the server, the service processing based on a specific service record among the first service record and the second service record corresponding to a higher reliability score of the first reliability score and the second reliability score.

19. The computer-implemented system of claim 18, wherein the first reliability score comprises first risk control information corresponding to the account information of the end-user device, the second reliability score comprises second risk control information corresponding to the account information of the service device.

20. The computer-implemented system of claim 15, wherein determining whether the first service record matches the second service record comprises:
   determining whether the first service record and the second service record satisfy one or more conditions, wherein the one or more conditions comprise:
      the account information of the end-user device that is comprised in the first service record matches the account information of the end-user device that is comprised in the second service record;
      the account information of the service device that is comprised in the first service record matches the account information of the service device that is comprised in the second service record; and
      the first amount that is comprised in the first service record matches the second amount that is comprised in the second service record.

* * * * *